US010606960B2

(12) United States Patent
Grove

(10) Patent No.: US 10,606,960 B2
(45) Date of Patent: *Mar. 31, 2020

(54) SYSTEM AND METHOD TO FACILITATE TRANSLATION OF COMMUNICATIONS BETWEEN ENTITIES OVER A NETWORK

(71) Applicant: eBay Inc., San Jose, CA (US)

(72) Inventor: Steve Grove, San Jose, CA (US)

(73) Assignee: eBay Inc., San Jose, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/367,128

(22) Filed: Dec. 1, 2016

(65) Prior Publication Data

US 2017/0083509 A1 Mar. 23, 2017

Related U.S. Application Data

(63) Continuation of application No. 14/165,434, filed on Jan. 27, 2014, now Pat. No. 9,514,128, which is a
(Continued)

(51) Int. Cl.
*G06F 17/28* (2006.01)
*G06F 17/27* (2006.01)
(Continued)

(52) U.S. Cl.
CPC .......... *G06F 17/289* (2013.01); *G06F 17/275* (2013.01); *G06F 17/28* (2013.01);
(Continued)

(58) Field of Classification Search
CPC ...... G06F 17/275; G06F 17/28; G06F 17/289; G06Q 31/08; G06Q 30/08; H04L 67/306; H04L 67/329; H04L 67/28; H04L 67/2823
(Continued)

(56) References Cited

U.S. PATENT DOCUMENTS 1,021,296 A 3/1912 Ault
1,029,262 A 6/1912 Bernheim
(Continued)

FOREIGN PATENT DOCUMENTS

CA 2253543 A1 3/1997
CN 1139782 A 1/1997
(Continued)

OTHER PUBLICATIONS

"Andale Lister", Copyright © 2002 Andale Inc., [Online]. [Archived Oct. 25, 2002]. Retrieved from the internet: <URL: http://web.archive.org/web/20021025121452/http://www.andale.com/corp/products/sell.jsp>, (2002), 3 pgs.
(Continued)

*Primary Examiner* — Jerry B Dennison
(74) *Attorney, Agent, or Firm* — Schwegman Lundberg & Woessner, P.A.

(57) ABSTRACT

A system and method to facilitate translation of communications between entities over a network are provided. The system receives a first language construct transmitted by a first entity that is directed to a second entity. The system identifies a construct identifier corresponding to the first language construct and determines a language preference of the second entity. A second language construct is retrieved by the system by locating an entry in a translated construct table that contains both the construct identifier and a language identifier corresponding to the language preference of the second entity, whereby the second language construct is a translation of the first language construct into a second language corresponding to the language preference. The second language construct is used to update information associated with the first entity.

20 Claims, 7 Drawing Sheets

Related U.S. Application Data continuation of application No. 12/783,458, filed on May 19, 2010, now Pat. No. 8,639,829, which is a continuation of application No. 09/976,301, filed on Oct. 11, 2001, now Pat. No. 7,752,266.

(51) Int. Cl.
  *G06Q 30/08* (2012.01)
  *H04L 29/08* (2006.01)

(52) U.S. Cl.
  CPC ............ *G06Q 30/08* (2013.01); *H04L 67/28* (2013.01); *H04L 67/2823* (2013.01); *H04L 67/306* (2013.01); *H04L 69/329* (2013.01)

(58) Field of Classification Search
  USPC ....................................................... 709/230
  See application file for complete search history.

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 3,652,795 A | 3/1972 | Wolf et al. |
| 3,687,256 A | 8/1972 | Jones |
| 4,118,788 A | 10/1978 | Roberts |
| 4,251,867 A | 2/1981 | Uchida et al. |
| 4,255,796 A | 3/1981 | Gabbe et al. |
| 4,412,287 A | 10/1983 | Braddock, III |
| 4,412,292 A | 10/1983 | Sedam et al. |
| 4,674,044 A | 6/1987 | Kalmus et al. |
| 4,677,552 A | 6/1987 | Sibley, Jr. |
| 4,766,293 A | 8/1988 | Boston |
| 4,789,928 A | 12/1988 | Fujisaki |
| 4,789,930 A | 12/1988 | Sones et al. |
| 4,799,156 A | 1/1989 | Shavit et al. |
| 4,811,199 A | 3/1989 | Kuechler et al. |
| 4,812,628 A | 3/1989 | Boston et al. |
| 4,823,264 A | 4/1989 | Deming |
| 4,823,265 A | 4/1989 | Nelson |
| 4,833,607 A | 5/1989 | Dethloff |
| 4,837,422 A | 6/1989 | Dethloff et al. |
| 4,864,516 A | 9/1989 | Gaither et al. |
| 4,877,947 A | 10/1989 | Mori |
| 4,903,201 A | 2/1990 | Wagner |
| 4,949,256 A | 8/1990 | Humble |
| 4,968,873 A | 11/1990 | Dethloff et al. |
| 4,982,346 A | 1/1991 | Girouard |
| 4,984,155 A | 1/1991 | Geier et al. |
| 4,992,940 A | 2/1991 | Dworkin |
| 5,056,019 A | 10/1991 | Schultz et al. |
| 5,063,507 A | 11/1991 | Lindsey et al. |
| 5,063,509 A | 11/1991 | Coles et al. |
| 5,063,523 A | 11/1991 | Vrenjak |
| 5,063,525 A | 11/1991 | Kurakake et al. |
| 5,076,433 A | 12/1991 | Howes |
| 5,077,665 A | 12/1991 | Silverman et al. |
| 5,077,669 A | 12/1991 | Gameau et al. |
| 5,101,353 A | 3/1992 | Lupien et al. |
| 5,128,752 A | 7/1992 | Von Kohorn |
| 5,136,501 A | 8/1992 | Silverman et al. |
| 5,168,446 A | 12/1992 | Wiseman |
| 5,168,458 A | 12/1992 | Gomes |
| 5,202,826 A | 4/1993 | McCarthy |
| 5,205,200 A | 4/1993 | Wright |
| 5,231,566 A | 7/1993 | Blutinger |
| 5,243,515 A | 9/1993 | Lee |
| 5,258,908 A | 11/1993 | Hartheimer et al. |
| 5,258,913 A | 11/1993 | Baldauf |
| 5,262,942 A | 11/1993 | Earle |
| 5,280,305 A | 1/1994 | Monroe |
| 5,280,422 A | 1/1994 | Moe et al. |
| 5,283,731 A | 2/1994 | Lalonde et al. |
| 5,285,383 A | 2/1994 | Lindsey et al. |
| 5,287,268 A | 2/1994 | McCarthy |
| 5,297,026 A | 3/1994 | Hoffman |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,335,170 A | 8/1994 | Petteruti et al. |
| 5,339,391 A | 8/1994 | Wroblewski et al. |
| 5,345,091 A | 9/1994 | Craig |
| 5,349,368 A | 9/1994 | Takeda et al. |
| 5,369,705 A | 11/1994 | Bird et al. |
| 5,369,761 A * | 11/1994 | Conley ................. G06F 16/284 |
| 5,375,055 A | 12/1994 | Togher et al. |
| 5,375,061 A | 12/1994 | Hara et al. |
| 5,380,991 A | 1/1995 | Valencia et al. |
| 5,383,113 A | 1/1995 | Kight et al. |
| 5,384,701 A | 1/1995 | Stentiford et al. |
| 5,392,428 A | 2/1995 | Robins |
| 5,394,324 A | 2/1995 | Clearwater |
| 5,401,946 A | 3/1995 | Weinblatt |
| 5,402,336 A | 3/1995 | Spiegelhoff et al. |
| 5,418,949 A | 5/1995 | Suzuki |
| 5,421,008 A | 5/1995 | Banning et al. |
| 5,424,944 A | 6/1995 | Kelly |
| 5,426,281 A | 6/1995 | Abecassis |
| 5,434,978 A | 7/1995 | Dockter et al. |
| 5,440,634 A | 8/1995 | Jones et al. |
| 5,442,546 A | 8/1995 | Kaji et al. |
| 5,442,782 A | 8/1995 | Malatesta et al. |
| 5,453,601 A | 9/1995 | Rosen |
| 5,453,926 A | 9/1995 | Stroschin et al. |
| 5,455,407 A | 10/1995 | Rosen |
| 5,479,600 A | 12/1995 | Wroblewski et al. |
| 5,485,510 A | 1/1996 | Colbert |
| 5,497,319 A | 3/1996 | Chong et al. |
| 5,506,897 A | 4/1996 | Moore et al. |
| 5,515,488 A | 5/1996 | Hoppe et al. |
| 5,521,815 A | 5/1996 | Rose, Jr. |
| 5,526,479 A | 6/1996 | Barstow et al. |
| 5,535,276 A | 7/1996 | Ganesan |
| 5,535,403 A | 7/1996 | Li et al. |
| 5,537,314 A | 7/1996 | Kanter |
| 5,544,051 A | 8/1996 | Senn et al. |
| 5,553,145 A | 9/1996 | Micali |
| 5,557,518 A | 9/1996 | Rosen |
| 5,557,728 A | 9/1996 | Garrett et al. |
| 5,567,740 A | 10/1996 | Free |
| 5,590,325 A | 12/1996 | Kolton et al. |
| 5,592,375 A | 1/1997 | Salmon et al. |
| 5,592,668 A | 1/1997 | Harding et al. |
| 5,596,994 A | 1/1997 | Bro |
| 5,598,557 A | 1/1997 | Doner et al. |
| 5,600,833 A | 2/1997 | Senn et al. |
| 5,606,691 A | 2/1997 | Watts et al. |
| 5,627,979 A | 5/1997 | Chang et al. |
| 5,638,457 A | 6/1997 | Deaton |
| 5,640,569 A | 6/1997 | Miller et al. |
| 5,644,721 A | 7/1997 | Chung et al. |
| 5,652,896 A | 7/1997 | Yamauchi et al. |
| 5,657,389 A | 8/1997 | Houvener |
| 5,659,165 A | 8/1997 | Jennings et al. |
| 5,664,111 A | 9/1997 | Nahan et al. |
| 5,664,115 A | 9/1997 | Fraser |
| 5,671,364 A | 9/1997 | Turk |
| 5,675,784 A | 10/1997 | Maxwell et al. |
| 5,687,323 A | 11/1997 | Hodroff |
| 5,689,652 A | 11/1997 | Lupien et al. |
| 5,689,663 A | 11/1997 | Williams |
| 5,694,546 A | 12/1997 | Reisman |
| 5,694,552 A | 12/1997 | Aharoni |
| 5,696,909 A | 12/1997 | Wallner |
| 5,696,910 A | 12/1997 | Pawlowski |
| 5,706,457 A | 1/1998 | Dwyer et al. |
| 5,708,780 A | 1/1998 | Levergood et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |

(56) References Cited

U.S. PATENT DOCUMENTS

| | | |
|---|---|---|
| 5,715,466 A | 2/1998 | Flanagan et al. |
| 5,717,989 A | 2/1998 | Tozzoli et al. |
| 5,721,897 A | 2/1998 | Rubinstein |
| 5,722,418 A | 3/1998 | Bro |
| 5,724,524 A | 3/1998 | Hunt et al. |
| 5,724,593 A | 3/1998 | Hargrave, III et al. |
| 5,727,165 A | 3/1998 | Ordish et al. |
| 5,729,594 A | 3/1998 | Klingman |
| 5,734,838 A | 3/1998 | Robinson et al. |
| 5,734,931 A | 3/1998 | Inoue et al. |
| 5,740,252 A | 4/1998 | Minor et al. |
| 5,752,242 A | 5/1998 | Havens |
| 5,757,917 A | 5/1998 | Rose et al. |
| 5,758,126 A | 5/1998 | Daniels et al. |
| 5,758,333 A | 5/1998 | Bauer et al. |
| 5,761,648 A | 6/1998 | Golden et al. |
| 5,768,581 A | 6/1998 | Cochran |
| 5,771,003 A | 6/1998 | Seymour |
| 5,771,291 A | 6/1998 | Newton et al. |
| 5,771,380 A | 6/1998 | Tanaka et al. |
| 5,774,553 A | 6/1998 | Rosen |
| 5,774,870 A | 6/1998 | Storey |
| 5,778,178 A | 7/1998 | Arunachalam |
| 5,778,213 A | 7/1998 | Shakib et al. |
| 5,778,356 A | 7/1998 | Heiny |
| 5,787,386 A | 7/1998 | Kaplan et al. |
| 5,787,402 A | 7/1998 | Potter et al. |
| 5,790,790 A | 8/1998 | Smith et al. |
| 5,794,207 A | 8/1998 | Walker et al. |
| 5,794,210 A | 8/1998 | Goldhaber et al. |
| 5,794,219 A | 8/1998 | Brown |
| 5,799,285 A | 8/1998 | Klingman |
| 5,803,500 A | 9/1998 | Mossberg |
| 5,806,044 A | 9/1998 | Powell |
| 5,818,914 A | 10/1998 | Fujisaki |
| 5,818,915 A | 10/1998 | Hayes, Jr. et al. |
| 5,822,737 A | 10/1998 | Ogram |
| 5,826,241 A | 10/1998 | Stein et al. |
| 5,826,244 A | 10/1998 | Huberman |
| 5,826,249 A | 10/1998 | Skeirik |
| 5,826,258 A | 10/1998 | Gupta |
| 5,832,452 A | 11/1998 | Schneider et al. |
| 5,835,061 A | 11/1998 | Stewart |
| 5,835,896 A | 11/1998 | Fisher et al. |
| 5,835,907 A | 11/1998 | Newman |
| 5,835,911 A | 11/1998 | Nakagawa et al. |
| 5,835,922 A | 11/1998 | Shima et al. |
| 5,838,965 A | 11/1998 | Kavanagh et al. |
| 5,841,437 A | 11/1998 | Fishkin et al. |
| 5,842,203 A | 11/1998 | D'Elena et al. |
| 5,845,143 A | 12/1998 | Yamauchi et al. |
| 5,845,155 A | 12/1998 | Nakata et al. |
| 5,845,265 A | 12/1998 | Woolston |
| 5,845,266 A | 12/1998 | Lupien et al. |
| 5,845,277 A | 12/1998 | Pfeil et al. |
| 5,845,278 A | 12/1998 | Kirsch et al. |
| 5,846,265 A | 12/1998 | McGregor et al. |
| 5,846,266 A | 12/1998 | Rattee |
| 5,848,396 A | 12/1998 | Gerace |
| 5,850,442 A | 12/1998 | Muftic |
| 5,850,454 A | 12/1998 | Hawks |
| 5,854,997 A | 12/1998 | Sukeda et al. |
| 5,855,003 A | 12/1998 | Ladden et al. |
| 5,855,007 A | 12/1998 | Jovicic et al. |
| 5,855,008 A | 12/1998 | Goldhaber et al. |
| 5,857,188 A | 1/1999 | Douglas |
| 5,857,201 A | 1/1999 | Wright et al. |
| 5,857,203 A | 1/1999 | Kauffman et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,883,620 A | 3/1999 | Hobbs |
| 5,884,056 A | 3/1999 | Steele |
| 5,884,246 A | 3/1999 | Boucher et al. |
| 5,884,247 A | 3/1999 | Christy |
| 5,884,277 A | 3/1999 | Khosla |
| 5,890,138 A | 3/1999 | Godin et al. |
| 5,897,621 A | 4/1999 | Boesch et al. |
| 5,897,622 A | 4/1999 | Blinn et al. |
| 5,903,874 A | 5/1999 | Leonard |
| 5,905,974 A | 5/1999 | Fraser et al. |
| 5,905,975 A | 5/1999 | Ausubel |
| 5,909,544 A | 6/1999 | Anderson et al. |
| 5,909,678 A | 6/1999 | Bergman et al. |
| 5,911,138 A | 6/1999 | Li et al. |
| 5,913,040 A | 6/1999 | Rakavy et al. |
| 5,913,203 A | 6/1999 | Wong et al. |
| 5,913,215 A | 6/1999 | Rubinstein et al. |
| 5,917,484 A | 6/1999 | Mullaney |
| 5,920,725 A | 7/1999 | Ma et al. |
| 5,922,074 A | 7/1999 | Richard et al. |
| 5,923,885 A | 7/1999 | Johnson et al. |
| 5,924,072 A | 7/1999 | Havens |
| 5,926,794 A | 7/1999 | Fethe |
| 5,933,145 A | 8/1999 | Meek |
| 5,933,811 A | 8/1999 | Angles et al. |
| 5,944,769 A | 8/1999 | Musk et al. |
| 5,944,790 A | 8/1999 | Levy |
| 5,945,652 A | 8/1999 | Ohki |
| 5,945,653 A | 8/1999 | Walker et al. |
| 5,953,423 A | 9/1999 | Rosen |
| 5,956,694 A | 9/1999 | Powell |
| 5,960,382 A | 9/1999 | Steiner |
| 5,960,409 A | 9/1999 | Wexler |
| 5,963,647 A | 10/1999 | Downing et al. |
| 5,963,917 A | 10/1999 | Ogram |
| 5,963,923 A | 10/1999 | Garber |
| 5,966,685 A | 10/1999 | Flanagan et al. |
| 5,969,974 A | 10/1999 | Vandenbelt et al. |
| 5,970,469 A | 10/1999 | Scroggie et al. |
| 5,971,274 A | 10/1999 | Milchman |
| 5,974,412 A | 10/1999 | Hazlehurst et al. |
| 5,983,196 A | 11/1999 | Wendkos |
| 5,987,500 A | 11/1999 | Arunachalam |
| 5,991,739 A | 11/1999 | Cupps et al. |
| 5,991,744 A | 11/1999 | DiCresce |
| 5,999,913 A | 12/1999 | Goodwin, III |
| 6,006,221 A | 12/1999 | Liddy et al. |
| 6,009,412 A | 12/1999 | Storey |
| 6,012,055 A | 1/2000 | Campbell et al. |
| 6,014,634 A | 1/2000 | Scroggie et al. |
| 6,016,955 A | 1/2000 | DeRooij et al. |
| 6,018,721 A | 1/2000 | Aziz et al. |
| 6,018,742 A | 1/2000 | Herbert, III |
| 6,022,222 A | 2/2000 | Guinan |
| 6,029,015 A | 2/2000 | Ishiguro |
| 6,029,141 A | 2/2000 | Bezos et al. |
| 6,029,150 A | 2/2000 | Kravitz |
| 6,032,130 A | 2/2000 | Alloul |
| 6,032,145 A | 2/2000 | Beall et al. |
| 6,035,280 A | 3/2000 | Christensen |
| 6,035,288 A | 3/2000 | Solomon |
| 6,035,402 A | 3/2000 | Vaeth et al. |
| 6,039,244 A | 3/2000 | Finsterwald |
| 6,044,363 A | 3/2000 | Mori et al. |
| 6,047,236 A | 4/2000 | Hancock et al. |
| 6,047,264 A | 4/2000 | Fisher et al. |
| 6,047,274 A | 4/2000 | Johnson |
| 6,049,785 A | 4/2000 | Gifford |
| 6,052,670 A | 4/2000 | Johnson |
| 6,055,518 A | 4/2000 | Franklin et al. |
| 6,066,518 A | 4/2000 | Franklin et al. |
| 6,058,379 A | 5/2000 | Odom et al. |
| 6,058,417 A | 5/2000 | Hess et al. |
| 6,061,448 A | 5/2000 | Smith et al. |
| 6,069,939 A | 5/2000 | Fung et al. |
| 6,073,117 A | 6/2000 | Oyanagi et al. |
| 6,077,085 A | 6/2000 | Parry et al. |
| 6,085,169 A | 7/2000 | Walker et al. |
| 6,085,176 A | 7/2000 | Woolston |
| 6,092,035 A | 7/2000 | Kurachi et al. |
| 6,092,037 A | 7/2000 | Stone et al. |
| 6,095,410 A | 8/2000 | Andersen et al. |

(56) References Cited

U.S. PATENT DOCUMENTS

| | | |
|---|---|---|
| 6,101,485 A | 8/2000 | Fortenberry et al. |
| 6,104,815 A | 8/2000 | Alcorn et al. |
| 6,105,001 A | 8/2000 | Masi |
| 6,105,008 A | 8/2000 | Davis et al. |
| 6,108,650 A | 8/2000 | Musk et al. |
| 6,111,574 A | 8/2000 | Meek |
| 6,119,137 A | 9/2000 | Smith et al. |
| 6,119,229 A | 9/2000 | Martinez et al. |
| 6,122,355 A | 9/2000 | Strohl |
| 6,122,606 A | 9/2000 | Johnson |
| 6,134,533 A | 10/2000 | Shell |
| 6,134,543 A | 10/2000 | Witkowski et al. |
| 6,138,106 A | 10/2000 | Walker et al. |
| 6,138,107 A | 10/2000 | Elgamal |
| 6,141,653 A | 10/2000 | Conklin et al. |
| 6,141,656 A | 10/2000 | Ozbutun et al. |
| 6,144,984 A | 11/2000 | DeBenedictis et al. |
| 6,144,985 A | 11/2000 | Rompe |
| 6,148,260 A | 11/2000 | Musk et al. |
| 6,151,589 A | 11/2000 | Aggarwal et al. |
| 6,151,594 A | 11/2000 | Wang |
| 6,157,841 A | 12/2000 | Bolduc et al. |
| 6,161,082 A | 12/2000 | Goldberg et al. |
| 6,161,094 A | 12/2000 | Adcock et al. |
| 6,167,567 A | 12/2000 | Chiles et al. |
| 6,167,573 B1 | 1/2001 | Lewis |
| 6,173,267 B1 | 1/2001 | Cairns |
| 6,178,408 B1 | 1/2001 | Copple et al. |
| 6,184,823 B1 | 2/2001 | Smith et al. |
| 6,189,003 B1 | 2/2001 | Leal |
| 6,192,407 B1 | 2/2001 | Smith et al. |
| 6,199,079 B1 | 3/2001 | Gupta |
| 6,202,051 B1 | 3/2001 | Woolston |
| 6,205,418 B1 | 3/2001 | Li et al. |
| 6,205,433 B1 | 3/2001 | Boesch et al. |
| 6,212,556 B1 | 4/2001 | Arunachalam |
| 6,226,412 B1 | 5/2001 | Schwab |
| 6,237,145 B1 | 5/2001 | Narasimhan et al. |
| 6,243,094 B1 | 6/2001 | Sklar |
| 6,243,691 B1 | 6/2001 | Fisher et al. |
| 6,243,699 B1 | 6/2001 | Fish |
| 6,246,996 B1 | 6/2001 | Stein et al. |
| 6,266,651 B1 | 7/2001 | Woolston |
| 6,266,652 B1 | 7/2001 | Godin et al. |
| 6,269,345 B1 | 7/2001 | Riboud |
| 6,272,675 B1 | 8/2001 | Schrab et al. |
| 6,275,789 B1 | 8/2001 | Moser et al. |
| 6,278,969 B1 | 8/2001 | King et al. |
| 6,278,980 B1 | 8/2001 | Wendkos |
| 6,282,507 B1 | 8/2001 | Horiguchi et al. |
| 6,285,998 B1 | 9/2001 | Black et al. |
| 6,286,002 B1 | 9/2001 | Axaopoulos et al. |
| 6,292,769 B1 | 9/2001 | Flanagan et al. |
| 6,301,554 B1 | 10/2001 | Christy |
| 6,301,555 B2 | 10/2001 | Hinderks |
| 6,308,172 B1 | 10/2001 | Agrawal et al. |
| 6,308,177 B1 | 10/2001 | Israni et al. |
| 6,317,727 B1 | 11/2001 | May |
| 6,317,738 B1 | 11/2001 | Lohman et al. |
| 6,321,208 B1 | 11/2001 | Barnett et al. |
| 6,321,210 B1 | 11/2001 | O'Brien et al. |
| 6,321,227 B1 | 11/2001 | Ryu |
| 6,326,962 B1 | 12/2001 | Szabo |
| 6,326,985 B1 | 12/2001 | Tazoe et al. |
| 6,326,988 B1 | 12/2001 | Gould et al. |
| 6,330,543 B1 | 12/2001 | Kepecs |
| 6,332,126 B1 | 12/2001 | Peirce et al. |
| 6,332,127 B1 | 12/2001 | Bandera et al. |
| 6,336,009 B1 | 1/2002 | Suzumi et al. |
| 6,336,098 B1 | 1/2002 | Fortenberry et al. |
| 6,336,099 B1 | 1/2002 | Barnett et al. |
| 6,336,105 B1 | 1/2002 | Conklin et al. |
| 6,339,755 B1 | 1/2002 | Hetherington et al. |
| 6,341,958 B1 | 1/2002 | Zilberman |
| 6,345,271 B1 | 2/2002 | Dempsey et al. |
| 6,345,273 B1 | 2/2002 | Cochran |
| 6,347,320 B1 | 2/2002 | Christensen et al. |
| 6,347,339 B1 | 2/2002 | Morris et al. |
| 6,349,275 B1 | 2/2002 | Schumacher et al. |
| 6,356,865 B1 | 3/2002 | Franz et al. |
| 6,363,337 B1 | 3/2002 | Amith |
| 6,386,446 B1 | 5/2002 | Himmel et al. |
| 6,389,427 B1 | 5/2002 | Faulkner |
| 6,396,515 B1 | 5/2002 | Hetherington et al. |
| 6,397,212 B1 | 5/2002 | Biffar |
| 6,401,077 B1 | 6/2002 | Godden et al. |
| 6,405,174 B1 | 6/2002 | Walker et al. |
| 6,405,175 B1 | 6/2002 | Ng |
| 6,415,270 B1 | 7/2002 | Rackson et al. |
| 6,415,282 B1 | 7/2002 | Mukherjea et al. |
| 6,421,653 B1 | 7/2002 | May |
| 6,434,545 B1 | 8/2002 | MacLeod et al. |
| 6,434,546 B1 | 8/2002 | Williamowski et al. |
| 6,438,524 B1 | 8/2002 | Shi |
| 6,442,479 B1 | 8/2002 | Barton |
| 6,446,048 B1 | 9/2002 | Wells et al. |
| 6,450,407 B1 | 9/2002 | Freeman et al. |
| 6,460,015 B1 | 10/2002 | Hetherington et al. |
| 6,460,020 B1 | 10/2002 | Pool et al. |
| 6,460,025 B1 | 10/2002 | Fohn et al. |
| 6,463,404 B1 | 10/2002 | Appleby |
| 6,463,405 B1 | 10/2002 | Case |
| 6,466,931 B1 | 10/2002 | Attaluri et al. |
| 6,473,729 B1 | 10/2002 | Gastaldo et al. |
| 6,473,734 B1 | 10/2002 | Dvorak |
| 6,487,553 B1 | 11/2002 | Emens et al. |
| 6,490,602 B1 | 12/2002 | Kraemer et al. |
| 6,493,661 B1 | 12/2002 | White, III et al. |
| 6,493,673 B1 | 12/2002 | Ladd et al. |
| 6,496,793 B1 | 12/2002 | Veditz et al. |
| 6,496,805 B1 | 12/2002 | Goodwin, III et al. |
| 6,507,813 B2 | 1/2003 | Veditz et al. |
| 6,515,656 B1 | 2/2003 | Wittenburg et al. |
| 6,516,329 B1 | 2/2003 | Smith |
| 6,523,000 B1 | 2/2003 | Ando et al. |
| 6,523,012 B1 | 2/2003 | Glassman et al. |
| 6,523,037 B1 | 2/2003 | Monahan et al. |
| 6,526,426 B1 | 2/2003 | Lakritz |
| 6,529,725 B1 | 3/2003 | Joao et al. |
| 6,529,896 B1 | 3/2003 | Leung et al. |
| 6,532,444 B1 | 3/2003 | Weber |
| 6,549,922 B1 | 4/2003 | Srivastava et al. |
| 6,549,941 B1 | 4/2003 | Jaquith et al. |
| 6,556,975 B1 | 4/2003 | Wittsche |
| 6,567,821 B1 | 5/2003 | Polk |
| 6,570,591 B1 | 5/2003 | Crovetto et al. |
| 6,571,216 B1 | 5/2003 | Garg et al. |
| 6,571,241 B1 | 5/2003 | Nosohara |
| 6,574,239 B1 | 6/2003 | Dowling et al. |
| 6,578,011 B1 | 6/2003 | Forward |
| 6,578,012 B1 | 6/2003 | Storey |
| 6,594,640 B1 | 7/2003 | Postrel |
| 6,598,026 B1 | 7/2003 | Ojha et al. |
| 6,598,028 B1 | 7/2003 | Sullivan et al. |
| 6,601,071 B1 | 7/2003 | Bowker et al. |
| 6,604,107 B1 | 8/2003 | Wang |
| 6,604,131 B1 | 8/2003 | Warris et al. |
| 6,616,703 B1 | 9/2003 | Nakagawa |
| 6,623,529 B1 | 9/2003 | Lakritz |
| 6,628,307 B1 | 9/2003 | Fair |
| 6,640,221 B1 | 10/2003 | Levine et al. |
| 6,643,624 B2 | 11/2003 | Philippe |
| 6,647,364 B1 | 11/2003 | Yumura et al. |
| 6,647,373 B1 | 11/2003 | Carlton-Foss |
| 6,651,220 B1 | 11/2003 | Penteroudakis et al. |
| 6,658,404 B1 | 12/2003 | Cecchini |
| 6,665,676 B2 | 12/2003 | Twig et al. |
| 6,671,681 B1 | 12/2003 | Emens et al. |
| 6,694,321 B1 | 2/2004 | Berno |
| 6,694,326 B2 | 2/2004 | Mayhew et al. |
| 6,701,314 B1 | 3/2004 | Conover et al. |
| 6,711,565 B1 | 3/2004 | Subramaniam et al. |
| 6,721,715 B2 | 4/2004 | Nemzow |
| 6,732,161 B1 | 4/2004 | Hess et al. |

(56) References Cited

U.S. PATENT DOCUMENTS

| | | |
|---|---|---|
| 6,748,367 B1 | 6/2004 | Lee |
| 6,768,997 B2 | 7/2004 | Schirmer et al. |
| 6,771,291 B1 | 8/2004 | DiStenfano |
| 6,778,193 B2 | 8/2004 | Biebesheimer et al. |
| 6,778,993 B2 | 8/2004 | Wang |
| 6,785,671 B1 | 8/2004 | Bailey et al. |
| 6,799,165 B1 | 9/2004 | Boesjes |
| 6,839,683 B1 | 1/2005 | Walker et al. |
| 6,842,739 B2 | 1/2005 | Postrel |
| 6,851,089 B1 | 2/2005 | Erickson et al. |
| 6,857,022 B1 | 2/2005 | Scanlan |
| 6,859,217 B2 | 2/2005 | Robertson et al. |
| 6,865,547 B1 | 3/2005 | Brake, Jr. et al. |
| 6,876,997 B1 | 4/2005 | Rorex et al. |
| 6,883,137 B1 | 4/2005 | Girardot et al. |
| 6,895,386 B1 | 5/2005 | Bachman et al. |
| 6,901,408 B2 | 5/2005 | Fachat et al. |
| 6,912,539 B1 | 7/2005 | Kapitanski et al. |
| 6,915,308 B1 | 7/2005 | Evans et al. |
| 6,925,608 B1 | 8/2005 | Neale et al. |
| 6,947,928 B2 | 9/2005 | Dettinger et al. |
| 6,965,882 B1 | 11/2005 | Lapstun et al. |
| 6,965,893 B1 | 11/2005 | Chan et al. |
| 6,970,883 B2 | 11/2005 | Ku et al. |
| 6,983,270 B2 | 1/2006 | Rippich |
| 6,999,932 B1 | 2/2006 | Zhou |
| 7,007,026 B2 | 2/2006 | Wilkinson et al. |
| 7,013,289 B2 | 3/2006 | Horn et al. |
| 7,031,985 B1 | 4/2006 | Pecheny |
| 7,072,826 B1 | 7/2006 | Wakita |
| 7,076,453 B2 | 7/2006 | Jammes et al. |
| 7,080,104 B2 | 7/2006 | Ring et al. |
| 7,100,195 B1 | 8/2006 | Underwood |
| 7,133,835 B1 | 11/2006 | Fusz et al. |
| 7,136,863 B2 | 11/2006 | Wang |
| 7,165,041 B1 | 1/2007 | Guheen et al. |
| 7,181,438 B1 | 2/2007 | Szabo |
| 7,185,000 B1 | 2/2007 | Brown et al. |
| 7,188,105 B2 | 3/2007 | Dettinger et al. |
| 7,191,393 B1 | 3/2007 | Chin et al. |
| 7,194,403 B2 | 3/2007 | Okura et al. |
| 7,206,768 B1 | 4/2007 | Degroeve et al. |
| 7,234,110 B2 | 6/2007 | Sumitomo |
| 7,240,022 B1 | 7/2007 | Bistriceanu et al. |
| 7,251,612 B1 | 7/2007 | Parker et al. |
| 7,296,033 B1 | 11/2007 | Lynch |
| 7,315,613 B2 | 1/2008 | Kleindienst et al. |
| 7,315,826 B1 | 1/2008 | Guheen et al. |
| 7,337,133 B1 | 2/2008 | Bezos et al. |
| 7,340,389 B2 | 3/2008 | Vargas |
| 7,346,526 B2 | 3/2008 | Daughtrey et al. |
| 7,383,248 B2 | 6/2008 | Chen |
| 7,398,229 B2 | 7/2008 | Budish |
| 7,418,390 B1 | 8/2008 | Jokipii |
| 7,458,507 B2 | 12/2008 | Fillinger et al. |
| 7,536,402 B2 | 5/2009 | Wang |
| 7,540,408 B2 | 6/2009 | Levine et al. |
| 7,546,254 B2 | 6/2009 | Bednarek |
| 7,599,857 B2 | 10/2009 | Bishop et al. |
| 7,644,037 B1 | 1/2010 | Ostrovsky |
| 7,644,374 B2 | 1/2010 | Wong et al. |
| 7,660,740 B2 | 2/2010 | Boone et al. |
| 7,739,353 B2 | 6/2010 | Philyaw |
| 7,742,985 B1 | 6/2010 | Digrigoli et al. |
| 7,752,034 B2 | 7/2010 | Brockett et al. |
| 7,752,266 B2 | 7/2010 | Grove |
| 7,801,816 B2 | 9/2010 | Alarcon-luther et al. |
| 7,856,384 B1 | 12/2010 | Kulasooriya et al. |
| 7,895,082 B2 | 2/2011 | Veres et al. |
| 7,908,132 B2 | 3/2011 | Brockett et al. |
| 7,941,348 B2 | 5/2011 | Veres et al. |
| 8,050,957 B2 | 11/2011 | Woehler |
| 8,051,061 B2 | 11/2011 | Niu et al. |
| 8,055,582 B2 | 11/2011 | Digrigoli et al. |
| 8,069,419 B2 | 11/2011 | Sanders et al. |
| 8,078,505 B2 | 12/2011 | Veres et al. |
| 8,140,510 B2 | 3/2012 | Hsiaozhang |
| 8,249,885 B2 | 8/2012 | Berkowitz et al. |
| 8,249,990 B2 | 8/2012 | Digrigoli et al. |
| 8,255,286 B2 | 8/2012 | Veres et al. |
| 8,266,016 B2 | 9/2012 | Boone et al. |
| 8,442,871 B2 | 5/2013 | Veres et al. |
| 8,601,373 B1 | 12/2013 | Ackley et al. |
| 8,639,782 B2 | 1/2014 | Liu et al. |
| 8,639,829 B2 | 1/2014 | Grove |
| 8,645,505 B2 | 2/2014 | Zellner et al. |
| 8,712,838 B2 | 4/2014 | Dietz |
| 8,712,913 B2 | 4/2014 | Digrigoli et al. |
| 8,719,041 B2 | 5/2014 | Veres et al. |
| 8,732,037 B2 | 5/2014 | Boone et al. |
| 8,799,218 B2 | 8/2014 | Liu et al. |
| 9,053,500 B2 | 6/2015 | Etesse et al. |
| 9,092,792 B2 | 7/2015 | Veres et al. |
| 9,189,568 B2 | 11/2015 | Munro et al. |
| 9,300,266 B2 | 3/2016 | Grokop |
| 9,514,128 B2 | 12/2016 | Grove |
| 9,736,269 B2 | 8/2017 | Liu et al. |
| 9,904,945 B2 | 2/2018 | Liu et al. |
| 10,062,104 B2 | 8/2018 | Veres et al. |
| 10,068,274 B2 | 9/2018 | Munro et al. |
| 2001/0007099 A1 | 7/2001 | Rau et al. |
| 2001/0009005 A1 | 7/2001 | Godin et al. |
| 2001/0011241 A1 | 8/2001 | Nemzow |
| 2001/0023407 A1 | 9/2001 | Liyanearachchi et al. |
| 2001/0025265 A1 | 9/2001 | Takayasu |
| 2001/0027436 A1 | 10/2001 | Tenembaum |
| 2001/0027472 A1 | 10/2001 | Guan |
| 2001/0029442 A1 | 10/2001 | Shiotsu et al. |
| 2001/0029455 A1* | 10/2001 | Chin ............... G06F 17/273 704/277 |
| 2001/0032164 A1 | 10/2001 | Kim |
| 2001/0032165 A1 | 10/2001 | Friend et al. |
| 2001/0032175 A1 | 10/2001 | Holden et al. |
| 2001/0032878 A1 | 10/2001 | Tsiounis et al. |
| 2001/0034694 A1 | 10/2001 | Elias |
| 2001/0039524 A1 | 11/2001 | Harrison, Jr. et al. |
| 2001/0039531 A1 | 11/2001 | Aoki |
| 2001/0041973 A1 | 11/2001 | Abkowitz et al. |
| 2001/0047308 A1 | 11/2001 | Kaminsky et al. |
| 2001/0049628 A1 | 12/2001 | Icho |
| 2001/0049647 A1 | 12/2001 | Sheehan |
| 2001/0049707 A1 | 12/2001 | Tran |
| 2001/0051932 A1 | 12/2001 | Srinivasan et al. |
| 2001/0051943 A1 | 12/2001 | Drucker et al. |
| 2002/0002538 A1 | 1/2002 | Ling |
| 2002/0010627 A1 | 1/2002 | Lerat |
| 2002/0013767 A1 | 1/2002 | Katz |
| 2002/0013774 A1 | 1/2002 | Morimoto |
| 2002/0016831 A1 | 2/2002 | Peled et al. |
| 2002/0019837 A1 | 2/2002 | Balnaves |
| 2002/0026363 A1 | 2/2002 | Dunaway, Jr. |
| 2002/0026423 A1 | 2/2002 | Maritzen et al. |
| 2002/0026471 A1 | 2/2002 | Bent et al. |
| 2002/0029182 A1 | 3/2002 | Nakagawa |
| 2002/0029339 A1 | 3/2002 | Rowe |
| 2002/0035466 A1 | 3/2002 | Kodama |
| 2002/0035595 A1 | 3/2002 | Yen et al. |
| 2002/0038282 A1 | 3/2002 | Montgomery |
| 2002/0040344 A1 | 4/2002 | Preiser et al. |
| 2002/0042835 A1 | 4/2002 | Pepin et al. |
| 2002/0046131 A1 | 4/2002 | Boone et al. |
| 2002/0046137 A1 | 4/2002 | Odom et al. |
| 2002/0046157 A1 | 4/2002 | Solomon |
| 2002/0049664 A1 | 4/2002 | Hoffman et al. |
| 2002/0052880 A1 | 5/2002 | Fruensgaard et al. |
| 2002/0055981 A1 | 5/2002 | Spaey et al. |
| 2002/0069049 A1 | 6/2002 | Turner |
| 2002/0069134 A1 | 6/2002 | Solomon |
| 2002/0069184 A1 | 6/2002 | Tilly et al. |
| 2002/0073015 A1 | 6/2002 | Chan et al. |
| 2002/0073111 A1 | 6/2002 | Heyliger |
| 2002/0082953 A1 | 6/2002 | Batham et al. |
| 2002/0082977 A1 | 6/2002 | Hammond et al. |
| 2002/0087558 A1 | 7/2002 | Bailey et al. |

(56) References Cited

U.S. PATENT DOCUMENTS

| | | |
|---|---|---|
| 2002/0087568 A1 | 7/2002 | LeDonne et al. |
| 2002/0087661 A1 | 7/2002 | Matichuk et al. |
| 2002/0091580 A1 | 7/2002 | Wang |
| 2002/0095462 A1 | 7/2002 | Beck et al. |
| 2002/0099562 A1 | 7/2002 | Bruce et al. |
| 2002/0099656 A1 | 7/2002 | Poh Wong |
| 2002/0099685 A1 | 7/2002 | Takano et al. |
| 2002/0103794 A1 | 8/2002 | Chang |
| 2002/0105532 A1 | 8/2002 | Oblinger |
| 2002/0105550 A1 | 8/2002 | Biebesheimer et al. |
| 2002/0107842 A1 | 8/2002 | Biebesheimer et al. |
| 2002/0107843 A1 | 8/2002 | Biebesheimer et al. |
| 2002/0107852 A1 | 8/2002 | Oblinger |
| 2002/0111889 A1 | 8/2002 | Buxton et al. |
| 2002/0111907 A1 | 8/2002 | Ling |
| 2002/0111967 A1 | 8/2002 | Nagase |
| 2002/0116293 A1 | 8/2002 | Lao et al. |
| 2002/0116318 A1 | 8/2002 | Thomas et al. |
| 2002/0120548 A1 | 8/2002 | Etkin |
| 2002/0120554 A1 | 8/2002 | Vega |
| 2002/0123959 A1 | 9/2002 | Mozley et al. |
| 2002/0123982 A1 | 9/2002 | Masuichi |
| 2002/0143612 A1 | 10/2002 | Barik et al. |
| 2002/0147655 A1 | 10/2002 | Say |
| 2002/0147656 A1 | 10/2002 | Tam et al. |
| 2002/0147784 A1 | 10/2002 | Gold et al. |
| 2002/0147790 A1 | 10/2002 | Snow |
| 2002/0149614 A1 | 10/2002 | Biebesheimer et al. |
| 2002/0152190 A1 | 10/2002 | Biebesheimer et al. |
| 2002/0154166 A1 | 10/2002 | Sanders et al. |
| 2002/0156688 A1 | 10/2002 | Horn et al. |
| 2002/0169662 A1 | 11/2002 | Claiborne |
| 2002/0169759 A1 | 11/2002 | Kraft et al. |
| 2002/0174010 A1 | 11/2002 | Rice |
| 2002/0174031 A1 | 11/2002 | Weiss |
| 2002/0174050 A1 | 11/2002 | Eynard et al. |
| 2002/0178178 A1 | 11/2002 | Peng |
| 2002/0184610 A1 | 12/2002 | Chong et al. |
| 2002/0188670 A1* | 12/2002 | Stringham ............ G06F 17/289 709/203 |
| 2002/0193986 A1 | 12/2002 | Schirris |
| 2002/0194166 A1 | 12/2002 | Fowler |
| 2002/0198713 A1 | 12/2002 | Franz et al. |
| 2003/0004809 A1 | 1/2003 | Palcic et al. |
| 2003/0005159 A1 | 1/2003 | Kumhyr |
| 2003/0009392 A1 | 1/2003 | Perkowski |
| 2003/0011608 A1 | 1/2003 | Wada |
| 2003/0014350 A1 | 1/2003 | Duell |
| 2003/0018885 A1 | 1/2003 | Landsman et al. |
| 2003/0022719 A1 | 1/2003 | Donald et al. |
| 2003/0033137 A1 | 2/2003 | Holubar et al. |
| 2003/0041014 A1 | 2/2003 | Grey et al. |
| 2003/0046059 A1 | 3/2003 | Litster et al. |
| 2003/0050861 A1 | 3/2003 | Martin |
| 2003/0055747 A1 | 3/2003 | Carr et al. |
| 2003/0061306 A1 | 3/2003 | Kanno et al. |
| 2003/0069829 A1 | 4/2003 | Gathman et al. |
| 2003/0074462 A1 | 4/2003 | Grove |
| 2003/0078033 A1 | 4/2003 | Sauer et al. |
| 2003/0083952 A1 | 5/2003 | Simpson et al. |
| 2003/0084051 A1 | 5/2003 | Depura et al. |
| 2003/0088566 A1 | 5/2003 | Wang |
| 2003/0093326 A1 | 5/2003 | Poon et al. |
| 2003/0105682 A1 | 6/2003 | Dicker et al. |
| 2003/0105705 A1 | 6/2003 | Eyre |
| 2003/0110047 A1 | 6/2003 | Santosuosso |
| 2003/0115484 A1 | 6/2003 | Moriconi et al. |
| 2003/0120560 A1 | 6/2003 | Almeida |
| 2003/0126235 A1 | 7/2003 | Chandrasekar et al. |
| 2003/0131006 A1 | 7/2003 | Monahan et al. |
| 2003/0139975 A1 | 7/2003 | Perkowski |
| 2003/0144922 A1 | 7/2003 | Schrantz |
| 2003/0154134 A1 | 8/2003 | Wang |
| 2003/0163575 A1 | 8/2003 | Perkins et al. |
| 2003/0165160 A1 | 9/2003 | Minami et al. |
| 2003/0167213 A1 | 9/2003 | Jammes et al. |
| 2003/0179703 A1 | 9/2003 | Levy et al. |
| 2003/0204449 A1 | 10/2003 | Kotas et al. |
| 2003/0208352 A1 | 11/2003 | Lee |
| 2003/0208477 A1 | 11/2003 | Smirniotopoulos et al. |
| 2003/0229544 A1 | 12/2003 | Veres |
| 2003/0229545 A1 | 12/2003 | Veres et al. |
| 2003/0229554 A1 | 12/2003 | Veres et al. |
| 2004/0001106 A1 | 1/2004 | Deutscher et al. |
| 2004/0034629 A1 | 2/2004 | Genser |
| 2004/0039639 A1 | 2/2004 | Walker et al. |
| 2004/0039692 A1 | 2/2004 | Shields et al. |
| 2004/0049423 A1 | 3/2004 | Kawashima et al. |
| 2004/0068488 A1 | 4/2004 | Dettinger et al. |
| 2004/0068489 A1 | 4/2004 | Dettinger et al. |
| 2004/0073507 A1 | 4/2004 | Scott et al. |
| 2004/0078297 A1 | 4/2004 | Veres et al. |
| 2004/0083213 A1 | 4/2004 | Wu et al. |
| 2004/0128224 A1 | 7/2004 | Dabney et al. |
| 2004/0138988 A1 | 7/2004 | Munro et al. |
| 2004/0142919 A1 | 7/2004 | Meissner |
| 2004/0204990 A1 | 10/2004 | Lee et al. |
| 2004/0204991 A1 | 10/2004 | Monahan et al. |
| 2004/0205118 A1 | 10/2004 | Yu |
| 2004/0215612 A1 | 10/2004 | Brody |
| 2004/0225606 A1 | 11/2004 | Nguyen et al. |
| 2004/0254853 A1 | 12/2004 | Heene et al. |
| 2005/0004911 A1 | 1/2005 | Goldberg et al. |
| 2005/0005266 A1 | 1/2005 | Datig |
| 2005/0021455 A1 | 1/2005 | Webster |
| 2005/0033655 A1 | 2/2005 | Woolston |
| 2005/0050477 A1 | 3/2005 | Robertson et al. |
| 2005/0102151 A1 | 5/2005 | Fuwa et al. |
| 2005/0102328 A1 | 5/2005 | Ring et al. |
| 2005/0108380 A1 | 5/2005 | Odhner et al. |
| 2005/0197897 A1 | 9/2005 | Veit et al. |
| 2005/0203673 A1 | 9/2005 | El-Hajj et al. |
| 2005/0210379 A1 | 9/2005 | Weathersby et al. |
| 2005/0222984 A1 | 10/2005 | Radestock et al. |
| 2005/0240392 A1 | 10/2005 | Munro et al. |
| 2005/0246296 A1 | 11/2005 | Ma et al. |
| 2005/0256852 A1 | 11/2005 | McNall et al. |
| 2006/0015452 A1 | 1/2006 | Kulasooriya et al. |
| 2006/0020576 A1 | 1/2006 | Karube |
| 2006/0047824 A1 | 3/2006 | Bowler |
| 2006/0059246 A1 | 3/2006 | Grove |
| 2006/0074792 A1 | 4/2006 | Wagoner et al. |
| 2006/0074984 A1 | 4/2006 | Milener |
| 2006/0089897 A1 | 4/2006 | Maas et al. |
| 2006/0100462 A1 | 5/2006 | Vanoppen et al. |
| 2006/0106783 A1 | 5/2006 | Saffer et al. |
| 2006/0136301 A1 | 6/2006 | Grovit |
| 2006/0167864 A1 | 7/2006 | Bailey et al. |
| 2006/0200353 A1 | 9/2006 | Bennett |
| 2006/0200462 A1 | 9/2006 | Kadayam et al. |
| 2006/0294005 A1 | 12/2006 | Drepak |
| 2007/0016893 A1 | 1/2007 | Branda et al. |
| 2007/0027472 A1 | 2/2007 | Hiles et al. |
| 2007/0039025 A1 | 2/2007 | Kraft et al. |
| 2007/0081197 A1 | 4/2007 | Omoigui |
| 2007/0083612 A1 | 4/2007 | Kim |
| 2007/0088722 A1 | 4/2007 | Wang |
| 2007/0088838 A1 | 4/2007 | Levkovitz et al. |
| 2007/0112643 A1 | 5/2007 | Veres et al. |
| 2007/0156523 A1 | 7/2007 | Liu et al. |
| 2007/0156677 A1 | 7/2007 | Szabo |
| 2007/0185850 A1 | 8/2007 | Walters et al. |
| 2007/0198391 A1 | 8/2007 | Dreyer et al. |
| 2007/0295903 A1 | 12/2007 | Schwartz |
| 2008/0043774 A1 | 2/2008 | Achtermann et al. |
| 2008/0052367 A1 | 2/2008 | Liu et al. |
| 2008/0133612 A1 | 6/2008 | Liu et al. |
| 2008/0147479 A1 | 6/2008 | Johnson |
| 2008/0152095 A1 | 6/2008 | Kleindienst et al. |
| 2009/0187565 A1 | 7/2009 | Wang |
| 2009/0228481 A1 | 9/2009 | Neale et al. |
| 2010/0131510 A1 | 5/2010 | Boone et al. |
| 2010/0228536 A1 | 9/2010 | Grove |
| 2010/0312695 A1 | 12/2010 | Digrigoli et al. |

(56) References Cited

U.S. PATENT DOCUMENTS

| | | |
|---|---|---|
| 2011/0231530 A1 | 9/2011 | Veres et al. |
| 2011/0307384 A1 | 12/2011 | Digrigoli et al. |
| 2012/0047029 A1 | 2/2012 | Veres et al. |
| 2012/0233259 A1 | 9/2012 | Work |
| 2012/0246233 A1 | 9/2012 | Veres et al. |
| 2012/0284304 A1 | 11/2012 | Boone et al. |
| 2012/0303529 A1 | 11/2012 | Digrigoli et al. |
| 2013/0018738 A1 | 1/2013 | Faires et al. |
| 2013/0117093 A1 | 5/2013 | Oda et al. |
| 2014/0142919 A1 | 5/2014 | Grove |
| 2014/0143321 A1 | 5/2014 | Liu et al. |
| 2014/0236815 A1 | 8/2014 | Digrigoli et al. |
| 2014/0297459 A1 | 10/2014 | Boone et al. |
| 2014/0297461 A1 | 10/2014 | Boone et al. |
| 2014/0297462 A1 | 10/2014 | Boone et al. |
| 2014/0297463 A1 | 10/2014 | Boone et al. |
| 2014/0297464 A1 | 10/2014 | Boone et al. |
| 2014/0297475 A1 | 10/2014 | Boone et al. |
| 2014/0297482 A1 | 10/2014 | Boone et al. |
| 2014/0297483 A1 | 10/2014 | Boone et al. |
| 2014/0297484 A1 | 10/2014 | Boone et al. |
| 2014/0304120 A1 | 10/2014 | Boone et al. |
| 2014/0324594 A1 | 10/2014 | Veres et al. |
| 2014/0337154 A1 | 11/2014 | Liu et al. |
| 2015/0127502 A1 | 5/2015 | Knepfle et al. |
| 2015/0371322 A1 | 12/2015 | Veres et al. |
| 2016/0071181 A1 | 3/2016 | Munro et al. |
| 2016/0241577 A1* | 8/2016 | Johnson ............... G06F 16/278 |
| 2018/0013859 A1 | 1/2018 | Liu et al. |
| 2019/0043117 A1 | 2/2019 | Veres et al. |
| 2019/0073388 A1* | 3/2019 | Desmarets ........... G06F 16/212 |

FOREIGN PATENT DOCUMENTS

| | | |
|---|---|---|
| CN | 102129642 A | 7/2011 |
| DE | 4308597 A1 | 8/1993 |
| EP | 0044226 A1 | 1/1982 |
| EP | 0251619 A2 | 1/1988 |
| EP | 0254812 A2 | 2/1988 |
| EP | 0273099 A1 | 7/1988 |
| EP | 0520695 A2 | 12/1992 |
| EP | 0542298 A2 | 5/1993 |
| EP | 0590861 A2 | 4/1994 |
| FR | 2658635 A1 | 8/1991 |
| GB | 1341693 A | 12/1973 |
| GB | 1380420 A | 1/1975 |
| GB | 2261579 A | 5/1993 |
| GB | 2295474 A | 5/1996 |
| GB | 2296413 A | 6/1996 |
| GB | 2301919 A | 12/1996 |
| JP | 2000322490 A | 11/2000 |
| JP | 2001000469 A | 1/2001 |
| JP | 2001319098 A | 11/2001 |
| JP | 2001338179 A | 12/2001 |
| JP | 2001357248 A | 12/2001 |
| JP | 2002092390 A | 3/2002 |
| JP | 2002109286 A | 4/2002 |
| JP | 2002207898 A | 7/2002 |
| JP | 2004094643 A | 3/2004 |
| KR | 20000018041 A | 4/2000 |
| KR | 20000024372 A | 5/2000 |
| KR | 20000049744 A | 8/2000 |
| KR | 20020059971 A | 7/2002 |
| KR | 20000037395 A | 4/2008 |
| NL | 9300266 A | 9/1994 |
| WO | 8809350 A | 12/1988 |
| WO | 9116691 A1 | 10/1991 |
| WO | WO-9215174 A1 | 9/1992 |
| WO | 9512169 A1 | 5/1995 |
| WO | WO-9517711 A1 | 6/1995 |
| WO | 9633568 A1 | 10/1996 |
| WO | WO-9634356 A1 | 10/1996 |
| WO | 9636024 A1 | 11/1996 |
| WO | 9641315 A1 | 12/1996 |
| WO | 9704411 A1 | 2/1997 |
| WO | WO-9737315 A1 | 10/1997 |
| WO | 9743727 A1 | 11/1997 |
| WO | 9748078 A2 | 12/1997 |
| WO | 9809447 A2 | 3/1998 |
| WO | 9809447 A3 | 3/1998 |
| WO | 9960503 A1 | 11/1999 |
| WO | WO-9963461 A1 | 12/1999 |
| WO | 0062231 A1 | 10/2000 |
| WO | WO-0058862 A2 | 10/2000 |
| WO | 0078557 A1 | 12/2000 |
| WO | 00079461 A1 | 12/2000 |
| WO | WO-0102926 A2 | 1/2001 |
| WO | 2001/16815 A2 | 3/2001 |
| WO | 2001/29750 A1 | 4/2001 |
| WO | 0137171 A1 | 5/2001 |
| WO | 0139059 A1 | 5/2001 |
| WO | 0152135 A1 | 7/2001 |
| WO | 0153929 A1 | 7/2001 |
| WO | WO-0157722 A1 | 8/2001 |
| WO | 0171579 A1 | 9/2001 |
| WO | 0171580 A1 | 9/2001 |
| WO | 0173665 A1 | 10/2001 |
| WO | 0180111 A1 | 10/2001 |
| WO | 0182107 A1 | 11/2001 |
| WO | WO-0182115 A1 | 11/2001 |
| WO | 0205179 A1 | 1/2002 |
| WO | WO-2002019220 A2 | 3/2002 |
| WO | 0231737 A1 | 4/2002 |
| WO | WO-0233618 A1 | 4/2002 |
| WO | 0248828 A1 | 6/2002 |
| WO | 02069101 A2 | 9/2002 |
| WO | 02097582 A2 | 12/2002 |
| WO | 2003040951 A1 | 2/2003 |
| WO | WO-03038560 A2 | 5/2003 |
| WO | WO-2003104931 A3 | 12/2003 |
| WO | 04093329 A2 | 10/2004 |
| WO | 2004090666 A2 | 10/2004 |
| WO | 2004090666 A3 | 10/2004 |
| WO | 2004092894 A2 | 10/2004 |
| WO | 2004093329 A3 | 10/2004 |
| WO | 2004093329 C1 | 10/2004 |

OTHER PUBLICATIONS

"Andale Lister: Bulk List", Copyright © 2002 Andale Inc., [Online]. [Archived Oct. 5, 2002]. Retrieved from the Internet: <URL: http://web.archive.org/web/20021005074745/http://www.andale.com/corp/products/qs_sell_details_bulklist.jsp>, (2002), 1 pg.

"Andale lister: Design Center", Copyright © 2002 Andale Inc. [Online]. [Archived Dec. 15, 2004]. Retrieved from the Internet: <URL: http://web.archive.org/web/20021215192044/http://www.andale.com/corp/products/qs_sell_details_designcenter.jsp>, (2004), 1 pg.

"Andale Lister: In-Line Images", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_inlineimg.jsp>, (2002), 1 pg.

"Andale Lister: Inventory Dashboard", Copyright © 2002 Andale Inc., [Online]. [Archived Dec. 15, 2002]. Retrieved from the Internet: <URL: http://web.archive.org/web/20021215192408/http://www.andale.com/corp/products/qs_sell_details_invdashboard.jsp, (2002), 2 pgs.

"Andale Lister: Launch Scheduler", Copyright © 2002 Andale Inc., [Online]. [Archived Dec. 15, 2002]. Retrieved from the Internet: <URL: http://web.archive.org/web/20021215192724/http://www.andale.com/corp/products/qs_sell_details_launchsched.jsp, (2002), 1 pg.

"Andale Lister: Online or Offline", Copyright © 2002 Andale Inc., [Online], [Archived Dec. 15, 2002], Retrieved from the Internet: <URL: http://web.archive.org/web/20021215194722/http://www.andale.com/corp/products/qs_sell_details_onoffline.jsp>, (2002), 2 pgs.

"Andale Lister: Overview", Copyright © 2002 Andale Inc., [Online]. [Archived Dec. 1, 2002]. Retrieved from the Internet: <URL:

(56) References Cited

OTHER PUBLICATIONS http://web.archive.org/web/20021201081906/http://www.andale.com/corp/products/qs_overview.jsp, (2002), 4 pgs.
"U.S. Appl. No. 09/602,110, Advisory Action dated Feb. 22, 2010", 3 pgs.
"U.S. Appl. No. 09/602,110, Advisory Action dated May 26, 2006", 3 pgs.
"U.S. Appl. No. 09/602,110, Amendment filed Apr. 28, 2008", 17 pgs.
"U.S. Appl. No. 09/602,110, Appeal Brief filed Apr. 26, 2010", 37 pgs.
"U.S. Appl. No. 09/602,110, Appeal Brief filed Dec. 15, 2006", 34 pgs.
"U.S. Appl. No. 09/602,110, Appeal Decision dated Feb. 28, 2008", 13 pgs.
"U.S. Appl. No. 09/602,110, Appeal Decision dated May 29, 2013", 10 pgs.
"U.S. Appl. No. 09/602,110, Decision on Pre-Appeal Brief dated Mar. 28, 2014", 2 pgs.
"U.S. Appl. No. 09/602,110, Decision on Pre-Appeal Brief dated Aug. 15, 2006", 2 pgs.
"U.S. Appl. No. 09/602,110, Examiner's Answer to Appeal Brief dated Mar. 7, 2007", 13 pgs.
"U.S. Appl. No. 09/602,110, Examiner's Answer to Appeal Brief dated Jun. 11, 2010", 20 pgs.
"U.S. Appl. No. 09/602,110, Final Office Action dated Mar. 8, 2006", 11 pgs.
"U.S. Appl. No. 09/602,110, Final Office Action dated Sep. 2, 2004", 13 pgs.
"U.S. Appl. No. 09/602,110, Final Office Action dated Sep. 10, 2014", 19 pgs.
"U.S. Appl. No. 09/602,110, Final Office Action dated Nov. 17, 2008", 12 pgs.
"U.S. Appl. No. 09/602,110, Final Office Action dated Nov. 21, 2005", 11 pgs.
"U.S. Appl. No. 09/602,110, Final Office Action dated Nov. 25, 2009", 17 pgs.
"U.S. Appl. No. 09/602,110, Final Office Action dated Nov. 25, 2013", 18 pgs.
"U.S. Appl. No. 09/602,110, Non Final Office Action dated Jan. 21, 2004", 13 pgs.
"U.S. Appl. No. 09/602,110, Non Final Office Action dated Apr. 5, 2005", 11 pgs.
"U.S. Appl. No. 09/602,110, Non Final Office Action dated Aug. 14, 2013", 20 pgs.
"U.S. Appl. No. 09/602,110, Non-Final Office Action dated Mar. 18, 2009", 19 pgs.
"U.S. Appl. No. 09/602,110, Non-Final Office Action dated Jul. 21, 2008", 12 pgs.
"U.S. Appl. No. 09/602,110, Pre-Appeal Brief Request filed Mar. 20, 2014", 5 pgs.
"U.S. Appl. No. 09/602,110, Pre-Appeal Brief Request filed Jun. 27, 2006", 4 pgs.
"U.S. Appl. No. 09/602,110, Reply Brief filed May 7, 2007", 11 pgs.
"U.S. Appl. No. 09/602,110, Reply Brief filed Aug. 11, 2010", 6 pgs.
"U.S. Appl. No. 09/602,110, Response filed Jan. 3, 2005 to Final Office Action dated Sep. 2, 2004", 16 pgs.
"U.S. Appl. No. 09/602,110, Response filed Jan. 23, 2006 to Final Office Action dated Nov. 21, 2005", 15 pgs.
"U.S. Appl. No. 09/602,110, Response filed Jan. 25, 2010 to Final Office Action dated Nov. 25, 2009", 22 pgs.
"U.S. Appl. No. 09/602,110, Response filed Feb. 17, 2009 to Final Office Action dated Nov. 17, 2008", 21 pgs.
"U.S. Appl. No. 09/602,110, Response filed May 8, 2006 to Final Office Action dated Mar. 8, 2006", 17 pgs.
"U.S. Appl. No. 09/602,110, Response filed May 21, 2004 to Non-Final Office Action dated Jan. 21, 2004", 18 pgs.
"U.S. Appl. No. 09/602,110, Response filed Jul. 20, 2009 to Non Final Office Action dated Mar. 18, 2009", 21 pgs.
"U.S. Appl. No. 09/602,110, Response filed Aug. 4, 2005 to Non Final Office Action dated Apr. 5, 2005", 19 pgs.
"U.S. Appl. No. 09/602,110, Response filed Oct. 21, 2008 to Non-Final Office Action dated Jul. 21, 2008", 19 pgs.
"U.S. Appl. No. 09/602,110, Response filed Nov. 14, 2013 to Non Final Office Action dated Aug. 14, 2013", 21 pgs.
"U.S. Appl. No. 09/905,525, Advisory Action dated May 2, 2008", 5 pgs.
"U.S. Appl. No. 09/905,525, Final Office Action dated Jan. 10, 2008", 15 pgs.
"U.S. Appl. No. 09/905,525, Final Office Action dated Jun. 29, 2006", 14 pgs.
"U.S. Appl. No. 09/905,525, Non Final Office Action dated Jun. 25, 2007", 16 pgs.
"U.S. Appl. No. 09/905,525, Non Final Office Action dated Dec. 12, 2005", 12 pgs.
"U.S. Appl. No. 09/905,525, Non Final Office Action dated Dec. 14, 2004", 11 pgs.
"U.S. Appl. No. 09/905,525, Non Final Office Action dated Dec. 18, 2006", 15 pgs.
"U.S. Appl. No. 09/905,525, Non-Final Office Action dated Mar. 5, 2009", 25 pgs.
"U.S. Appl. No. 09/905,525, Non-Final Office Action dated Aug. 22, 2008", 17 pgs.
"U.S. Appl. No. 09/905,525, Notice of Allowance dated Sep. 18, 2009", 12 pgs.
"U.S. Appl. No. 09/905,525, Response filed Mar. 19. 2007 to Non Final Office Action dated Dec. 18, 2006", 9 pgs.
"U.S. Appl. No. 09/905,525, Response filed Mar. 27, 2008 to Non Final Office Action dated Jan. 10, 2008", 17 pgs.
"U.S. Appl. No. 09/905,525, Response filed Apr. 12, 2006 to Non Final Office Action dated Dec. 12, 2005", 8 pgs.
"U.S. Appl. No. 09/905,525, Response filed Apr. 13, 2005 to Non Final Office Action dated Dec. 14, 2004", 17 pgs.
"U.S. Appl. No. 09/905,525, Response filed Jun. 5, 2009 to Non Final Office Action dated Mar. 5, 2009", 19 pgs.
"U.S. Appl. No. 09/905,525, Response filed Jun. 10, 2008 to Advisory Action dated May 2, 2008", 20 pgs.
"U.S. Appl. No. 09/905,525, Response filed Sep. 22, 2006 to Final Office Action dated Jun. 29, 2006", 19 pgs.
"U.S. Appl. No. 09/905,525, Response filed Sep. 25, 2007 to Non Final Office Action dated Jun. 25, 2007", 17 pgs.
"U.S. Appl. No. 09/905,525, Response filed Nov. 24, 2008 to Non Final Office Action dated Aug. 22, 2008", 17 pgs.
"U.S. Appl. No. 09/976,301, 312 Amendment filed Jan. 10, 2010", 4 pgs.
"U.S. Appl. No. 09/976,301, Advisory Action dated Jun. 9, 2008", 5 pgs.
"U.S. Appl. No. 09/976,301, Advisory Action dated Aug. 13, 2009", 3 pgs.
"U.S. Appl. No. 09/976,301, Advisory Action dated Sep. 30, 2005", 3 pgs.
"U.S. Appl. No. 09/976,301, Advisory Action dated Nov. 30, 2006", 3 pgs.
"U.S. Appl. No. 09/976,301, Decision on Pre-Appeal Brief dated Jul. 29, 2008", 2 pgs.
"U.S. Appl. No. 09/976,301, Examiner Interview Summary dated Sep. 9, 2009", 4 pgs.
"U.S. Appl. No. 09/976,301, Examiner Interview Summary dated Dec. 8, 2006", 4 pgs.
"U.S. Appl. No. 09/976,301, Final Office Action dated Mar. 17, 2008", 14 pgs.
"U.S. Appl. No. 09/976,301, Final Office Action dated Jun. 4, 2009", 15 pgs.
"U.S. Appl. No. 09/976,301, Final Office Action dated Jul. 13, 2005", 11 pgs.
"U.S. Appl. No. 09/976,301, Final Office Action dated Aug. 25, 2006", 14 pgs.
"U.S. Appl. No. 09/976,301, Non Final Office Action dated Mar. 9, 2007", 13 pgs.
"U.S. Appl. No. 09/976,301, Non Final Office Action dated Sep. 13, 2007", 12 pgs.

(56) References Cited

OTHER PUBLICATIONS

"U.S. Appl. No. 09/976,301, Non Final Office Action dated Nov. 24, 2004", 31 pgs.
"U.S. Appl. No. 09/976,301, Non Final Office Action dated Dec. 16, 2005", 17 pgs.
"U.S. Appl. No. 09/976,301, Non-Final Office Action dated Dec. 23, 2008", 23 pgs.
"U.S. Appl. No. 09/976,301, Notice of Allowance dated Dec. 2, 2009", 13 pgs.
"U.S. Appl. No. 09/976,301, Pre-Appeal Brief Request filed Jun. 16, 2008", 5 pgs.
"U.S. Appl. No. 09/976,301, PTO Response to 312 Amendment dated Feb. 3, 2010", 2 pgs.
"U.S. Appl. No. 09/976,301, Response filed Mar. 23, 2009 to Non Final Office Action dated Dec. 23, 2008", 19 pgs.
"U.S. Appl. No. 09/976,301, Response filed Apr. 6, 2005 to Non Final Office Action dated Nov. 24, 2004", 15 pgs.
"U.S. Appl. No. 09/976,301, Response filed May 16, 2006 to Non Final Office Action dated Dec. 16, 2005", 24 pgs.
"U.S. Appl. No. 09/976,301, Response filed May 19, 2008 to Final Office Action dated Mar. 17, 2008", 19 pgs.
"U.S. Appl. No. 09/976,301, Response filed Jun. 7, 2007 to Non Final Office Action dated Mar. 9, 2007", 7 pgs.
"U.S. Appl. No. 09/976,301, Response filed Aug. 4, 2009 to Final Office Action dated Jun. 4, 2009", 15 pgs.
"U.S. Appl. No. 09/976,301, Response filed Sep. 4, 2009 to Final Office Action dated Jun. 4, 2009", 20 pgs.
"U.S. Appl. No. 09/976,301, Response filed Sep. 13, 2005 to Final Office Action dated Jul. 13, 2005", 13 pgs.
"U.S. Appl. No. 09/976,301, Response filed Sep. 29, 2008 to Final Office Action dated Mar. 17, 2008", 19 pgs.
"U.S. Appl. No. 09/976,301, Response filed Oct. 13, 2005 to Advisory Action dated Sep. 30, 2005", 14 pgs.
"U.S. Appl. No. 09/976,301, Response filed Oct. 24, 2006 to Final Office Action dated Aug. 25, 2006", 6 pgs.
"U.S. Appl. No. 09/976,301, Response filed Dec. 13, 2007 to Non-Final Office Action dated Sep. 13, 2007", 17 pgs.
"U.S. Appl. No. 09/976,301, Response filed Dec. 20, 2006 to Advisory Action dated Nov. 30, 2006", 16 pgs.
"U.S. Appl. No. 10/252,126, Appeal Brief filed Feb. 4, 2009", 22 pgs.
"U.S. Appl. No. 10/252,126, Decision on Appeal dated Sep. 15, 2010", 8 pgs.
"U.S. Appl. No. 10/252,126, Examiner Interview Summary dated Oct. 26, 2007", 1 pg.
"U.S. Appl. No. 10/252,126, Examiner's Answer to Appeal Brief dated Apr. 29, 2009", 12 pgs.
"U.S. Appl. No. 10/252,126, Final Office Action dated Feb. 26, 2008", 12 pgs.
"U.S. Appl. No. 10/252,126, Final Office Action dated Jun. 27, 2006", 11 pgs.
"U.S. Appl. No. 10/252,126, Final Office Action dated Sep. 4, 2008", 13 pgs.
"U.S. Appl. No. 10/252,126, Non Final Office Action dated Jan. 30, 2007", 9 pgs.
"U.S. Appl. No. 10/252,126, Non Final Office Action dated Feb. 3, 2006", 8 pgs.
"U.S. Appl. No. 10/252,126, Non Final Office Action dated Aug. 20, 2007", 8 pgs.
"U.S. Appl. No. 10/252,126, Notice of Allowance dated Dec. 30, 2010", 13 pgs.
"U.S. Appl. No. 10/252,126, Response filed May 3, 2006 to Non Final Office Action dated Feb. 3, 2006", 7 pgs.
"U.S. Appl. No. 10/252,126, Response filed Jun. 25, 2007 to Non Final Office Action dated Jan. 30, 2007", 11 pgs.
"U.S. Appl. No. 10/252,126, Response filed Jul. 28, 2008 to Final Office Action dated Feb. 26, 2008", 7 pgs.
"U.S. Appl. No. 10/252,126, Response filed Oct. 27, 2006 to Final Office Action dated Jun. 27, 2006", 8 pgs.
"U.S. Appl. No. 10/252,126, Response filed Dec. 20, 2007 to Non-Final Office Action dated Aug. 20, 2007", 8 pgs.
"U.S. Appl. No. 10/252,126, Response filed Dec. 29, 2005 to Restriction Requirement dated Oct. 31, 2005", 5 pgs.
"U.S. Appl. No. 10/252,126, Restriction Requirement dated Oct. 31, 2005", 7 pgs.
"U.S. Appl. No. 10/252,127, Advisory Action dated Jan. 10, 2007", 3 pgs.
"U.S. Appl. No. 10/252,127, Advisory Action dated Mar. 29, 2010", 3 pgs.
"U.S. Appl. No. 10/252,127, Advisory Action dated May 1, 2008", 3 pgs.
"U.S. Appl. No. 10/252,127, Advisory Action dated Dec. 12, 2008", 3 pgs.
"U.S. Appl. No. 10/252,127, Appeal Brief filed Mar. 11, 2009", 27 pgs.
"U.S. Appl. No. 10/252,127, Applicant's Summary of Examiner Interview filed Apr. 15, 2011", 2 pgs.
"U.S. Appl. No. 10/252,127, Decision on Pre-Appeal Brief dated Feb. 11, 2009", 2 pgs.
"U.S. Appl. No. 10/252,127, Decision on Pre-Appeal Brief dated May 12, 2008", 2 pgs.
"U.S. Appl. No. 10/252,127, Decision on Pre-Appeal Brief Request dated May 14, 2010", 2 pgs.
"U.S. Appl. No. 10/252,127, Final Office Action dated Jan. 7, 2010", 11 pgs.
"U.S. Appl. No. 10/252,127, Final Office Action dated Jan. 11, 2008", 11 pgs.
"U.S. Appl. No. 10/252,127, Final Office Action dated Sep. 4, 2008", 12 pgs.
"U.S. Appl. No. 10/252,127, Final Office Action dated Oct. 6, 2006", 10 pgs.
"U.S. Appl. No. 10/252,127, Non Final Office Action dated Mar. 21, 2006", 9 pgs.
"U.S. Appl. No. 10/252,127, Non Final Office Action dated Jul. 11, 2007", 9 pgs.
"U.S. Appl. No. 10/252,127, Non-Final Office Action dated Jun. 26, 2009", 14 pgs.
"U.S. Appl. No. 10/252,127, Non-Final Office Action dated Sep. 10, 2010", 11 pgs.
"U.S. Appl. No. 10/252,127, Notice of Allowance dated Mar. 18, 2011", 16 pgs.
"U.S. Appl. No. 10/252,127, Notice of Allowance dated Jul. 28, 2011", 6 pgs.
"U.S. Appl. No. 10/252,127, Pre-Appeal Brief Request filed Jan. 5, 2009", 5 pgs.
"U.S. Appl. No. 10/252,127, Pre-Appeal Brief Request filed Apr. 7, 2010", 5 pgs.
"U.S. Appl. No. 10/252,127, Pre-Appeal Brief Request filed Apr. 10, 2008", 5 pgs.
"U.S. Appl. No. 10/252,127, Response filed Jan. 14, 2011 to Non Final Office Action dated Sep. 10, 2010", 18 pgs.
"U.S. Appl. No. 10/252,127, Response filed Mar. 8, 2010 to Final Office Action dated Jan. 7, 2010", 17 pgs.
"U.S. Appl. No. 10/252,127, Response filed Mar. 27, 2008 to Final Office Action dated Jan. 11, 2008", 16 pgs.
"U.S. Appl. No. 10/252,127, Response filed Jun. 12, 2008 to Advisory Action dated May 1, 2008", 16 pgs.
"U.S. Appl. No. 10/252,127, Response filed Jun. 12, 2008 to Final Office Action dated Jan. 11, 2008", 16 pgs.
"U.S. Appl. No. 10/252,127, Response filed Jun. 21, 2006 to Non Final Office Action dated Mar. 21, 2006", 8 pgs.
"U.S. Appl. No. 10/252,127, Response filed Sep. 28, 2009 to Non Final Office Action dated Jun. 26, 2009", 16 pgs.
"U.S. Appl. No. 10/252,127, Response filed Oct. 11, 2007 to Non-Final Office Action dated Jul. 11, 2007", 15 pgs.
"U.S. Appl. No. 10/252,127, Response filed Nov. 4, 2008 to Final Office Action dated Sep. 4, 2008", 22 pgs.
"U.S. Appl. No. 10/252,127, Response filed Dec. 6, 2006 to Final Office Action dated Oct. 6, 2006", 14 pgs.
"U.S. Appl. No. 10/252,128, Appeal Brief filed Dec. 15, 2009", 23 pgs.

(56) References Cited

OTHER PUBLICATIONS

"U.S. Appl. No. 10/252,128, Appeal Decision dated Jan. 31, 2013", 6 pgs.
"U.S. Appl. No. 10/252,128, Decision on Pre-Appeal Brief Request dated Oct. 15, 2009", 2 pgs.
"U.S. Appl. No. 10/252,128, Examiner's Answer to Appeal Brief dated Mar. 31, 2010", 11 pgs.
"U.S. Appl. No. 10/252,128, Final Office Action dated Apr. 3, 2009", 27 pgs.
"U.S. Appl. No. 10/252,128, Non-Final Office Action dated Mar. 21, 2008", 12 pgs.
"U.S. Appl. No. 10/252,128, Notice of Allowance dated May 30, 2013", 9 pgs.
"U.S. Appl. No. 10/252,128, Notice of Allowance dated Dec. 23, 2013", 10 pgs.
"U.S. Appl. No. 10/252,128, Pre-Appeal Brief Request filed Aug. 3, 2009", 4 pgs.
"U.S. Appl. No. 10/252,128, Response filed Jul. 21, 2008 to Non-Final Office Action dated Mar. 21, 2008", 11 pgs.
"U.S. Appl. No. 10/252,128, Response filed Dec. 23, 2008 to Restriction Requirement dated Nov. 24, 2008", 10 pgs.
"U.S. Appl. No. 10/252,128, Restriction Requirement dated Nov. 24, 2008", 8 pgs.
"U.S. Appl. No. 10/252,129, Advisory Action dated Mar. 13, 2007", 3 pgs.
"U.S. Appl. No. 10/252,129, Advisory Action dated Sep. 2, 2009", 2 pgs.
"U.S. Appl. No. 10/252,129, Advisory Action dated Oct. 4, 2010", 3 pgs.
"U.S. Appl. No. 10/252,129, Advisory Action dated Oct. 6, 2009", 3 pgs.
"U.S. Appl. No. 10/252,129, Advisory Action dated Nov. 26, 2008", 3 pgs.
"U.S. Appl. No. 10/252,129, Amendment filed May 20, 2014", 17 pgs.
"U.S. Appl. No. 10/252,129, Appeal Brief filed Jan. 24, 2011", 21 pgs.
"U.S. Appl. No. 10/252,129, Appeal Brief filed Apr. 25, 2011", 32 pgs.
"U.S. Appl. No. 10/252,129, Appeal Decision dated Mar. 20, 2014", 13 pgs.
"U.S. Appl. No. 10/252,129, Examiner Interview Summary dated Mar. 19, 2008", 2 pgs.
"U.S. Appl. No. 10/252,129, Examiner Interview Summary dated Mar. 31, 2009", 2 pgs.
"U.S. Appl. No. 10/252,129, Examiner Interview Summary dated May 15, 2015", 3 pgs.
"U.S. Appl. No. 10/252,129, Examiner Interview Summary dated Jul. 11, 2008", 2 pgs.
"U.S. Appl. No. 10/252,129, Examiner Interview Summary dated Dec. 1, 2014", 3 pgs.
"U.S. Appl. No. 10/252,129, Examiner's Answer to Appeal Brief dated May 13, 2011", 19 pgs.
"U.S. Appl. No. 10/252,129, Final Office Action dated Apr. 22, 2015", 35 pgs.
"U.S. Appl. No. 10/252,129, Final Office Action dated Apr. 23, 2010", 18 pgs.
"U.S. Appl. No. 10/252,129, Final Office Action dated May 29, 2008", 9 pgs.
"U.S. Appl. No. 10/252,129, Final Office Action dated Jun. 18, 2009", 12 pgs.
"U.S. Appl. No. 10/252,129, Final Office Action dated Sep. 15, 2008", 11 pgs.
"U.S. Appl. No. 10/252,129, Final Office Action dated Oct. 5, 2007", 10 pgs.
"U.S. Appl. No. 10/252,129, Final Office Action dated Dec. 27, 2006", 12 pgs.
"U.S. Appl. No. 10/252,129, Non Final Office Action dated May 15, 2007", 10 pgs.
"U.S. Appl. No. 10/252,129, Non Final Office Action dated Aug. 18, 2006", 10 pgs.
"U.S. Appl. No. 10/252,129, Non Final Office Action dated Sep. 23, 2014", 31 pgs.
"U.S. Appl. No. 10/252,129, Non Final Office Action dated Nov. 20, 2015", 35 pgs.
"U.S. Appl. No. 10/252,129, Non-Final Office Action dated Jan. 14, 2008", 10 pgs.
"U.S. Appl. No. 10/252,129, Non-Final Office Action dated Feb. 10, 2009", 11 pgs.
"U.S. Appl. No. 10/252,129, Non-Final Office Action dated Nov. 12, 2009", 19 pgs.
"U.S. Appl. No. 10/252,129, Response filed Feb. 12, 2010 to Non Final Office Action dated Nov. 12, 2009", 20 pgs.
"U.S. Appl. No. 10/252,129, Response filed Feb. 27, 2007 to Final Office Action dated Dec. 27, 2006", 14 pgs.
"U.S. Appl. No. 10/252,129, Response filed Apr. 14, 2008 to Non-Final Office Action dated Jan. 14, 2008", 14 pgs.
"U.S. Appl. No. 10/252,129, Response filed May 11, 2009 to Non Final Office Action dated Feb. 10, 2009", 15 pgs.
"U.S. Appl. No. 10/252,129, Response filed Jul. 10, 2015 to Final Office Action dated Apr. 22, 2015", 21 pgs.
"U.S. Appl. No. 10/252,129, Response filed Jul. 31, 2008 to Final Office Action dated May 29, 2008", 13 pgs.
"U.S. Appl. No. 10/252,129, Response filed Aug. 13, 2007 to Non-Final Office Action dated May 15, 2007", 16 pgs.
"U.S. Appl. No. 10/252,129, Response filed Aug. 18, 2009 to Final Office Action dated Jun. 18, 2009", 19 pgs.
"U.S. Appl. No. 10/252,129, Response filed Sep. 18, 2009 to Advisory Action dated Sep. 2, 2009", 19 pgs.
"U.S. Appl. No. 10/252,129, Response filed Sep. 23, 2010 to Final Office Action dated Apr. 23, 2010", 16 pgs.
"U.S. Appl. No. 10/252,129, Response filed Oct. 5, 2006 to Non Final Office Action dated Aug. 18, 2006", 15 pgs.
"U.S. Appl. No. 10/252,129, Response filed Oct. 19, 2009 to Advisory Action dated Oct. 6, 2009", 17 pgs.
"U.S. Appl. No. 10/252,129, Response filed Nov. 11, 2008 to Final Office Action dated Sep. 15, 2008", 14 pgs.
"U.S. Appl. No. 10/252,129, Response filed Nov. 26, 2007 to Final Office Action dated Oct. 5, 2007", 15 pgs.
"U.S. Appl. No. 10/252,129, Response filed Dec. 2, 2008 to Advisory Action dated Nov. 26, 2008", 14 pgs.
"U.S. Appl. No. 10/252,129, Response filed Dec. 2, 2008 to Final Office Action dated Sep. 15, 2008", 14 pgs.
"U.S. Appl. No. 10/252,129, Response filed Dec. 17, 2014 to Non Final Office Action dated Sep. 23, 2014", 24 pgs.
"U.S. Appl. No. 10/831,421, Advisory Action dated Jan. 2, 2014", 3 pgs.
"U.S. Appl. No. 10/831,421, Examiner Interview Summary dated Jan. 12, 2015", 3 pgs.
"U.S. Appl. No. 10/831,421, Examiner Interview Summary dated Apr. 30, 2013", 3 pgs.
"U.S. Appl. No. 10/831,421, Examiner Interview Summary dated May 13, 2015", 3 pgs.
"U.S. Appl. No. 10/831,421, Final Office Action dated Jun. 13, 2008", 18 pgs.
"U.S. Appl. No. 10/831,421, Final Office Action dated Jul. 9, 2009", 18 pgs.
"U.S. Appl. No. 10/831,421, Final Office Action dated Aug. 31, 2011", 25 pgs.
"U.S. Appl. No. 10/831,421, Final Office Action dated Sep. 7, 2010", 20 pgs.
"U.S. Appl. No. 10/831,421, Final Office Action dated Sep. 8, 2014", 29 pgs.
"U.S. Appl. No. 10/831,421, Final Office Action dated Oct. 16, 2013", 30 pgs.
"U.S. Appl. No. 10/831,421, Final Office Action dated Nov. 30, 2012", 30 pgs.
"U.S. Appl. No. 10/831,421, Non Final Office Action dated Feb. 9, 2015", 13 pgs.
"U.S. Appl. No. 10/831,421, Non Final Office Action dated Feb. 13, 2014", 30 pgs.

(56) References Cited

OTHER PUBLICATIONS

"U.S. Appl. No. 10/831,421, Non Final Office Action dated Mar. 14, 2011", 21 pgs.
"U.S. Appl. No. 10/831,421, Non Final office Action dated May 10, 2012", 34 pgs.
"U.S. Appl. No. 10/831,421, Non Final Office Action dated May 23, 2013", 18 pgs.
"U.S. Appl. No. 10/831,421, Non-Final Office Action dated Jan. 12, 2009", 16 pgs.
"U.S. Appl. No. 10/831,421, Non-Final Office Action dated Mar. 5, 2010", 20 pgs.
"U.S. Appl. No. 10/831,421, Non-Final Office Action dated Nov. 28, 2007", 12 pgs.
"U.S. Appl. No. 10/831,421, Notice of Allowance dated Jul. 10, 2015", 10 pgs.
"U.S. Appl. No. 10/831,421, Response filed Jan. 8, 2015 to Final Office Action dated Sep. 8, 2014", 12 pgs.
"U.S. Appl. No. 10/831,421, Response filed Jan. 11, 2010 to Final Office Action dated Jul. 9, 2009", 6 pgs.
"U.S. Appl. No. 10/831,421, Response filed Feb. 28, 2008 to Non-Final Office Action dated Nov. 28, 2007", 23 pgs.
"U.S. Appl. No. 10/831,421, Response filed Apr. 13, 2009 to Non Final Office Action dated Jan. 12, 2009", 18 pgs.
"U.S. Appl. No. 10/831,421, Response filed Apr. 30, 2013 to Final Office Action dated Nov. 30, 2012", 14 pgs.
"U.S. Appl. No. 10/831,421, Response filed May 11, 2015 to Non Final Office Action dated Feb. 9, 2015", 11 pgs.
"U.S. Appl. No. 10/831,421, Response filed Jun. 14, 2011 to Non Final Office Action dated Mar. 14, 2011", 7 pgs.
"U.S. Appl. No. 10/831,421, Response filed Jul. 6, 2010 to Non Final Office Action dated Mar. 5, 2010", 7 pgs.
"U.S. Appl. No. 10/831,421, Response filed Jul. 14, 2014 to Non Final Office Action dated Feb. 13, 2014", 13 pgs
"U.S. Appl. No. 10/831,421, Response filed Aug. 23, 2013 to Non Final Office Action dated May 23, 2013", 12 pgs.
"U.S. Appl. No. 10/831,421, Response filed Sep. 7, 2012 to Non Final Office Action dated May 10, 2012", 9 pgs.
"U.S. Appl. No. 10/831,421, Response filed Oct. 10, 2008 to Final Office Action dated Jun. 13, 2008", 20 pgs.
"U.S. Appl. No. 10/831,421, Response filed Nov. 29, 2010 to Final Office Action dated Sep. 7, 2010", 8 pgs.
"U.S. Appl. No. 10/831,421, Response Filed Nov. 30, 2011 to Non-Final Office Action dated Aug. 31, 2011", 11 pgs.
"U.S. Appl. No. 10/831,421, Response filed Dec. 16, 2013 to Final Office Action dated Oct. 16, 2013", 14 pgs.
"U.S. Appl. No. 10/831,421; Response filed Jan. 16, 2014 to Final Office Action dated Oct. 16, 2013", 14 pgs.
"U.S. Appl. No. 11/647,728, Examiner Interview Summary dated Aug. 11, 2010", 3 pgs.
"U.S. Appl. No. 11/647,728, Final Office Action dated Jul. 13, 2010", 17 pgs.
"U.S. Appl. No. 11/647,728, Non-Final Office Action dated Mar. 8, 2010", 18 pgs.
"U.S. Appl. No. 11/647,728, Notice of Allowance dated Oct. 19, 2010", 11 pgs.
"U.S. Appl. No. 11/647,728, Response filed Jun. 8, 2010 to Non Final Office Action dated Mar. 8, 2010", 13 pgs.
"U.S. Appl. No. 11/647,728, Response filed Sep. 22, 2010 to Final Office Action dated Jul. 13, 2010", 14 pgs.
"U.S. Appl. No. 12/693,275, Non Final Office Action dated Dec. 30, 2011", 6 pgs.
"U.S. Appl. No. 12/693,275, Notice of Allowance dated May 8, 2012", 11 pgs.
"U.S. Appl. No. 12/693,275, Response filed Mar. 19, 2012 to Non Final Office Action dated Dec. 30, 2011", 13 pgs.
"U.S. Appl. No. 12/783,458 , Response filed Aug. 15, 2013 to Non Final Office Action dated May 10, 2013", 9 pgs.
"U.S. Appl. No. 12/783,458, Final Office Action dated Sep. 25, 2012", 12 pgs.
"U.S. Appl. No. 12/783,458, Non Final Office Action dated Mar. 8, 2012", 16 pgs.
"U.S. Appl. No. 12/783,458, Non Final Office Action dated May 10, 2013", 12 pgs.
"U.S. Appl. No. 12/783,458, Notice of Allowance dated Sep. 24, 2013", 6 pgs.
"U.S. Appl. No. 12/783,458, Response filed Jan. 18, 2013 to Final Office Action dated Sep. 25, 2012", 10 pgs.
"U.S. Appl. No. 12/783,458, Response filed Jun. 8, 2012 to Non Final Office Action dated Mar. 8, 2012", 9 pgs.
"U.S. Appl. No. 13/080,426, Non Final Office Action dated Oct. 31, 2011", 8 pgs.
"U.S. Appl. No. 13/080,426, Notice of Allowance dated Jan. 26, 2012", 7 pgs.
"U.S. Appl. No. 13/080,426, Notice of Allowance dated Apr. 23, 2012", 7 pgs.
"U.S. Appl. No. 13/080,426, Response filed Dec. 28, 2011 to Non Final Office Action dated Oct. 31, 2011", 9 pgs.
"U.S. Appl. No. 13/285,916, Advisory Action dated Jan. 30, 2013", 3 pgs.
"U.S. Appl. No. 13/285,916, Decision on Pre-Appeal Brief dated Jul. 15, 2014", 2 pgs.
"U.S. Appl. No. 13/285,916, Examiner Interview Summary dated Jan. 22, 2015", 3 pgs.
"U.S. Appl. No. 13/285,916, Final Office Action dated Apr. 23, 2014", 16 pgs.
"U.S. Appl. No. 13/285,916, Final Office Action dated Nov. 21, 2012", 17 pgs.
"U.S. Appl. No. 13/285,916, Non Final Office Action dated Jun. 4, 2012", 16 pgs.
"U.S. Appl. No. 13/285,916, Non Final Office Action dated Jul. 15, 2013", 17 pgs.
"U.S. Appl. No. 13/285,916, Non Final Office Action dated Oct. 30, 2014", 19 pgs.
"U.S. Appl. No. 13/285,916, Notice of Allowance dated Mar. 3, 2015", 5 pgs.
"U.S. Appl. No. 13/285,916, Pre-Appeal Brief Request filed Jun. 20, 2014", 5 pgs.
"U.S. Appl. No. 13/285,916, PTO Response to Rule 312 Communication dated Jun. 9, 2015", 2 pgs.
"U.S. Appl. No. 13/285,916, Response filed Jan. 17, 2013 to Final Office Action dated Nov. 21, 2012", 15 pgs.
"U.S. Appl. No. 13/285,916, Response filed Jan. 30, 2015 to Non Final Office Action dated Oct. 30, 2014", 22 pgs.
"U.S. Appl. No. 13/285,916, Response filed Aug. 30, 2012 to Non Final Office Action dated Jun. 4, 2012", 15 pgs.
"U.S. Appl. No. 13/285,916, Response filed Oct. 14, 2013 to Non Final Office Action dated Jul. 15, 2013", 13 pgs.
"U.S. Appl. No. 13/285,916, Supplemental Notice of Allowability dated Apr. 1, 2015", 4 pgs.
"U.S. Appl. No. 13/285,916, Supplemental Notice of Allowability dated Jun. 18, 2015", 4 pgs.
"U.S. Appl. No. 13/489,646, 312 Amendment filed Mar. 7, 2013", 4 pgs.
"U.S. Appl. No. 13/489,646, Non Final Office Action dated Sep. 19, 2012", 8 pgs.
"U.S. Appl. No. 13/489,646, Notice of Allowance dated Jan. 10, 2013", 7 pgs.
"U.S. Appl. No. 13/489,646, PTO Response to 312 Amendment dated Mar. 14, 2013", 2 pgs.
"U.S. Appl. No. 13/489,646, Response filed Dec. 3, 2012 to Non Final Office Action dated Sep. 19, 2012", 11 pgs.
"U.S. Appl. No. 13/550,233, Final Office Action dated Oct. 30, 2013", 7 pgs.
"U.S. Appl. No. 13/550,233, Non Final Office Action dated Mar. 26, 2013", 12 pgs.
"U.S. Appl. No. 13/550,233, Notice of Allowance dated Jan. 8, 2014", 11 pgs.
"U.S. Appl. No. 13/550,233, Response filed Jun. 24, 2013 to Non Final Office Action dated Mar. 26, 2013", 14 pgs.
"U.S. Appl. No. 13/550,233, Response filed Dec. 20, 2013 to Final Office Action dated Oct. 30, 2013", 9 pgs.

(56) References Cited

OTHER PUBLICATIONS

"U.S. Appl. No. 14/165,434, Non Final Office Action dated Mar. 8, 2016", 16 pgs.
"U.S. Appl. No. 14/165,434, Notice of Allowance dated Aug. 3, 2016", 6 pgs.
"U.S. Appl. No. 14/165,434, Preliminary Amendment filed Jun. 6, 2014", 7 pgs.
"U.S. Appl. No. 14/165,434, Response filed Jun. 8, 2016 to Non Final Office Action dated Mar. 8, 2016", 16 pgs.
"U.S. Appl. No. 14/231,613, Examiner Interview Surrrmary dated Nov. 3, 2016", 3 pgs.
"U.S. Appl. No. 14/231,613, Final Office Action dated Nov. 3, 2016", 27 pgs.
"U.S. Appl. No. 14/231,613, Non Final Office Action dated Jun. 3, 2016", 20 pgs.
"U.S. Appl. No. 14/231,613, Preliminary Amendment dated Apr. 14, 2014", 8 pgs.
"U.S. Appl. No. 14/231,613, Response filed Sep. 28, 2016 to Non Final Office Action dated Jun. 3, 2016", 17 pgs.
"U.S. Appl. No. 14/231,624, Decision on Pre-Appeal Brief dated Dec. 8, 2016", 2 pgs.
"U.S. Appl. No. 14/231,624, Final Office Action dated Aug. 31, 2016", 28 pgs.
"U.S. Appl. No. 14/231,624, Final Office Action dated Oct. 22, 2015", 28 pgs.
"U.S. Appl. No. 14/231,624, Non Final Office Action dated Feb. 23, 2016", 36 pgs.
"U.S. Appl. No. 14/231,624, Non Final Office Action dated May 22, 2015", 19 pgs.
"U.S. Appl. No. 14/231,624, Pre Appeal Brief Request filed Oct. 28, 2016", 6 pgs.
"U.S. Appl. No. 14/231,624, Preliminary Amendment filed Apr. 14, 2014", 9 pgs.
"U.S. Appl. No. 14/231,624, Response filed Jul. 7, 2016 to Non Final Office Action dated Feb. 23, 2016", 16 pgs.
"U.S. Appl. No. 14/231,624, Response filed Aug. 22, 2015 to Non Final Office Action dated May 22, 2015", 12 pgs.
"U.S. Appl. No. 14/231,624, Response filed Dec. 10, 2015 to Final Office Action dated Oct. 22, 2015", 15 pgs.
"U.S. Appl. No. 14/231,624, Supplemental Amendment filed Aug. 23, 2016", 7 pgs.
"U.S. Appl. No. 14/231,633 Supplemental Amendment filed Aug. 17, 2016", 9 pgs.
"U.S. Appl. No. 14/231,633, Decision on Pre-Appeal Brief dated Nov. 10, 2016", 2 pgs.
"U.S. Appl. No. 14/231,633, Final Office Action dated Aug. 24, 2016", 28 pgs.
"U.S. Appl. No. 14/231,633, Final Office Action dated Oct. 16, 2015", 25 pgs.
"U.S. Appl. No. 14/231,633, Non Final Office Action dated Mar. 24, 2015", 16 pgs.
"U.S. Appl. No. 14/231,633, Non Final Office Action dated Apr. 22, 2016", 35 pgs.
"U.S. Appl. No. 14/231,633, Pre-Appeal Brief Request filed Oct. 5, 2016", 6 pgs.
"U.S. Appl. No. 14/231,633, Preliminary Amendment dated Apr. 14, 2014", 8 pgs.
"U.S. Appl. No. 14/231,633, Response filed Jul. 7, 2016 to Non Final Office Action dated Apr. 22, 2016", 14 pgs.
"U.S. Appl. No. 14/231,633, Response filed Aug. 5, 2015 to Non Final Office Action dated Mar. 24, 2015", 11 pgs.
"U.S. Appl. No. 14/231,633, Response filed Dec. 10, 2015 to Final Office Action dated Oct. 16, 2015", 14 pgs.
"U.S. Appl. No. 14/231,639 Supplemental Amendment filed Aug. 17, 2016", 8 pgs.
"U.S. Appl. No. 14/231,639, Decision on Pre-Appeal Brief dated Dec. 9, 2016", 2 pgs.
"U.S. Appl. No. 14/231,639, Final Office Action dated Aug. 26, 2016", 28 pgs.
"U.S. Appl. No. 14/231,639, Final Office Action dated Oct. 23, 2015", 28 pgs.
"U.S. Appl. No. 14/231,639, Non Final Office Action dated Feb. 23, 2016", 36 pgs.
"U.S. Appl. No. 14/231,639, Non Final Office Action dated Jul. 16, 2015", 19 pgs.
"U.S. Appl. No. 14/231,639, Pre Appeal Brief Request filed Oct. 28, 2016".
"U.S. Appl. No. 14/231,639, Preliminary Amendment dated Apr. 11, 2014", 8 pgs.
"U.S. Appl. No. 14/231,639, Response filed Jul. 7, 2016 to Non Final Office Action dated Feb. 23, 2016", 16 pgs.
"U.S. Appl. No. 14/231,639, Response filed Aug. 25, 2015 to Non Final Office Action dated Jul. 16, 2015", 14 pgs.
"U.S. Appl. No. 14/231,639, Response filed Dec. 10, 2015 to Final Office Action dated Oct. 23, 2015", 14 pgs.
"U.S. Appl. No. 14/231,650, Decision on Pre-Appeal Brief dated Dec. 8, 2016", 2 pgs.
"U.S. Appl. No. 14/231,650, Examiner Interview Summary dated Mar. 25, 2016", 3 pgs.
"U.S. Appl. No. 14/231,650, Final Office Action dated Aug. 31, 2016", 28 pgs.
"U.S. Appl. No. 14/231,650, Final Office Action dated Oct. 23, 2015", 28 pgs.
"U.S. Appl. No. 14/231,650, Non Final Office Action dated Mar. 3, 2015", 18 pgs.
"U.S. Appl. No. 14/231,650, Non Final Office Action dated Mar. 25, 2016", 34 pgs.
"U.S. Appl. No. 14/231,650, Pre-Appeal Brief Request filed Oct. 28, 2016", 6 pgs.
"U.S. Appl. No. 14/231,650, Preliminary Amendment filed Apr. 9, 2014", 8 pgs.
"U.S. Appl. No. 14/231,650, Response filed Jul. 7, 2016 to Non Final Office dated Mar. 25, 2016", 16 pgs.
"U.S. Appl. No. 14/231,650, Response filed Aug. 3, 2015 to Non Final Office Action dated Mar. 3, 2015", 11 pgs.
"U.S. Appl. No. 14/231,650, Response filed Dec. 10, 2015 to Final Office Action dated Oct. 23, 2015", 15 pgs.
"U.S. Appl. No. 14/231,650, Supplemental Amendment filed Aug. 23, 2016", 8 pgs.
"U.S. Appl. No. 14/231,684, Decision on Pre-Appeal Brief dated Dec. 8, 2016", 2 pgs.
"U.S. Appl. No. 14/231,684, Final Office Action dated Aug. 31, 2016", 29 pgs.
"U.S. Appl. No. 14/231,684, Final Office Action dated Oct. 28, 2015", 26 pgs.
"U.S. Appl. No. 14/231,684, Non Final Office Action dated Feb. 10, 2016", 31 pgs.
"U.S. Appl. No. 14/231,684, Non Final Office Action dated Mar. 3, 2015", 16 pgs.
"U.S. Appl. No. 14/231,684, Pre-Appeal Brief Request filed Oct. 28, 2016", 6 pgs.
"U.S. Appl. No. 14/231,684, Preliminary Amendment filed Apr. 9, 2014", 8 pgs.
"U.S. Appl. No. 14/231,684, Response filed Jul. 7, 2016 to Non Final Office Action dated Feb. 10, 2016", 16 pgs.
"U.S. Appl. No. 14/231,684, Response filed Aug. 3, 2015 to Non Final Office Action dated Mar. 3, 2015", 10 pgs.
"U.S. Appl. No. 14/231,684, Response filed Dec. 16, 2015 to Final Office Action dated Oct. 28, 2015", 12 pgs.
"U.S. Appl. No. 14/231,684, Supplemental Amendment filed Aug. 23, 2016", 8 pgs.
"U.S. Appl. No. 14/231,696 Supplemental Amendment filed Aug. 16, 2016", 9 pgs.
"U.S. Appl. No. 14/231,696, Decision on Pre-Appeal Brief Request dated Nov. 10, 2016", 2 pgs.
"U.S. Appl. No. 14/231,696, Final Office Action dated Feb. 8, 2016", 31 pgs.
"U.S. Appl. No. 14/231,696, Final Office Action dated Feb. 24, 2015", 22 pgs.
"U.S. Appl. No. 14/231,696, Non Final Office Action dated Jul. 31, 2014", 18 pgs.

(56) References Cited

OTHER PUBLICATIONS

"U.S. Appl. No. 14/231,696, Non Final Office Action dated Aug. 23, 2016", 28 pgs.
"U.S. Appl. No. 14/231,696, Non Final Office Action dated Oct. 22, 2015", 29 pgs.
"U.S. Appl. No. 14/231,696, Pre Appeal Brief Request for Review filed Oct. 13, 2016", 5 pgs.
"U.S. Appl. No. 14/231,696, Preliminary Amendment filed Apr. 9, 2014", 8 pgs.
"U.S. Appl. No. 14/231,696, Response filed Jul. 7, 2016 to Final Office Action dated Feb. 8, 2016", 16 pgs.
"U.S. Appl. No. 14/231,696, Response filed Jul. 24, 2015 to Final Office Action dated Feb. 24, 2015", 12 pgs.
"U.S. Appl. No. 14/231,696, Response filed Oct. 31, 2014 to Non Final Office Action dated Jul. 31, 2014", 23 pgs.
"U.S. Appl. No. 14/231,696, Response filed Dec. 10, 2015 to Non Final Office Action dated Oct. 22, 2015", 15 pgs.
"U.S. Appl. No. 14/231,706, Decision on Pre-Appeal Brief dated Dec. 8, 2016", 2 pgs.
"U.S. Appl. No. 14/231,706, Final Office Action dated Sep. 1, 2016", 28 pgs.
"U.S. Appl. No. 14/231,706, Final Office Action dated Oct. 14, 2015", 29 pgs.
"U.S. Appl. No. 14/231,706, Non Final Office Action dated Feb. 11, 2016", 32 pgs.
"U.S. Appl. No. 14/231,706, Non Final Office Action dated Mar. 25, 2015", 15 pgs.
"U.S. Appl. No. 14/231,706, Pre Appeal Brief Request filed Oct. 28, 2016", 6 pgs.
"U.S. Appl. No. 14/231,706, Preliminary Amendment filed Apr. 9, 2014", 8 pgs.
"U.S. Appl. No. 14/231,706, Response filed Jul. 7, 2016 to Non Final Office Action dated Feb. 11, 2016", 15 pgs.
"U.S. Appl. No. 14/231,706, Response filed Jul. 13, 2015 to Non Final Office Action dated Mar. 25, 2015", 10 pgs.
"U.S. Appl. No. 14/231,706, Response filed Dec. 10, 2015 to Final Office Action dated Oct. 14, 2015", 14 pgs.
"U.S. Appl. No. 14/231,706, Supplemental Amendment filed Aug. 23, 2016", 7 pgs.
"U.S. Appl. No. 14/231,719, Decision on Pre-Appeal Brief Request dated Nov. 10, 2016", 2 pgs.
"U.S. Appl. No. 14/231,719, Final Office Action dated Feb. 9, 2016", 32 pgs.
"U.S. Appl. No. 14/231,719, Final Office Action dated Feb. 24, 2015", 16 pgs.
"U.S. Appl. No. 14/231,719, Non Final Office Action dated Aug. 12, 2016", 33 pgs.
"U.S. Appl. No. 14/231,719, Non Final Office Action dated Aug. 14, 2014", 12 pgs.
"U.S. Appl. No. 14/231,719, Non Final Office Action dated Nov. 19, 2015", 25 pgs.
"U.S. Appl. No. 14/231,719, Pre Appeal Brief Request for Review field Oct. 13, 2016", 5 pgs.
"U.S. Appl. No. 14/231,719, Preliminary Amendment filed Apr. 9, 2014", 8 pgs.
"U.S. Appl. No. 14/231,719, Response filed Jul. 5, 2016 to Final Office Action dated Feb. 9, 2016", 16 pgs.
"U.S. Appl. No. 14/231,719, Response filed Jul. 13, 2015 to Final Office Action dated Feb. 24, 2015", 11 pgs.
"U.S. Appl. No. 14/231,719, Response filed Nov. 12, 2014 to Non Final Office Action dated Aug. 14, 2014", 17 pgs.
"U.S. Appl. No. 14/231,719, Response filed Dec. 16, 2015 to Non Final Office Action dated Nov. 19, 2015", 14 pgs.
"U.S. Appl. No. 14/231,722, Decision on Pre-Appeal Brief Request dated Nov. 9, 2016", 2 pgs.
"U.S. Appl. No. 14/231,722, Final Office Action dated Aug. 3, 2016", 33 pgs.
"U.S. Appl. No. 14/231,722, Final Office Action dated Oct. 21, 2015", 26 pgs.
"U.S. Appl. No. 14/231,722, Non Final Office Action dated Feb. 9, 2016", 32 pgs.
"U.S. Appl. No. 14/231,722, Non Final Office Action dated Feb. 25, 2015", 13 pgs.
"U.S. Appl. No. 14/231,722, Pre-Appeal Brief Request filed Oct. 3, 2016", 6 pgs.
"U.S. Appl. No. 14/231,722, Preliminary Amendment filed Apr. 9, 2014", 8 pgs.
"U.S. Appl. No. 14/231,722, Response filed Jun. 6, 2016 to Non Final Office Action dated Feb. 9, 2016", 15 pgs.
"U.S. Appl. No. 14/231,722, Response filed Jul. 13, 2015 to Non Final Office Action dated Feb. 25, 2015", 9 pgs.
"U.S. Appl. No. 14/231,722, Response filed Dec. 10, 2015 to Final Office Action dated Oct. 21, 2015", 14 pgs.
"U.S. Appl. No. 14/268,986, Examiner Interview Summary dated Sep. 16, 2016", 3 pgs.
"U.S. Appl. No. 14/268,986, Final Office Action dated Dec. 3, 2015", 13 pgs.
"U.S. Appl. No. 14/268,986, Non Final Office Action dated Jun. 17, 2016", 17 pgs.
"U.S. Appl. No. 14/268,986, Non Final Office Action dated Jul. 2, 2015", 13 pgs.
"U.S. Appl. No. 14/268,986, Notice of Non-Compliant Amendment dated Aug. 12, 2014", 3 pgs.
"U.S. Appl. No. 14/268,986, Preliminary Amendment filed May 5, 2014", 7 pgs.
"U.S. Appl. No. 14/268,986, Response filed Apr. 4, 2016 to Final Office Action dated Dec. 3, 2016", 21 pgs.
"U.S. Appl. No. 14/268,986, Response filed Sep. 19, 2016 to Non Final Office Action dated Jun. 17, 2016", 24 pgs.
"U.S. Appl. No. 14/268,986, Response filed Oct. 2, 2015 to Non Final Office Action dated Jul. 2, 2015", 10 pgs.
"U.S. Appl. No. 14/268,986, Response filed Nov. 12, 2014 to Notice of Non-Compliant Amendment dated Aug. 12, 2014", 3 pgs.
"U.S. Appl. No. 14/268,986, Supplemental Preliminary Amendment filed May 9, 2014", 7 pgs.
"U.S. Appl. No. 14/595,074, Final Office Action dated Jan. 14, 2016", 10 pgs.
"U.S. Appl. No. 14/595,074, First Office Action Interview Office Action Summary dated Jun. 22, 2015", 4 pgs.
"U.S. Appl. No. 14/595,074, Pre-Interview First Office Action dated Apr. 2, 2015", 4 pgs.
"U.S. Appl. No. 14/595,074, Preliminary Amendment filed Jan. 19, 2015", 10 pgs.
"U.S. Appl. No. 14/595,074, Response filed Jun. 2, 2015 to First Office Action Interview Pilot Program Pre-Interview dated Apr. 2, 2015", 2 pgs.
"U.S. Appl. No. 14/595,074, Response filed Aug. 24, 2015 to First Action Interview Office Action Summary dated Jun. 22, 2015", 18 pgs.
"U.S. Appl. No. 14/790,661, Preliminary Amendment filed Jul. 6, 2015", 7 pgs.
"U.S. Appl. No. 14/942,213, Non Final Office Action dated Nov. 30, 2016", 18 pgs.
"Auction Watch: Buyer and Seller Services", [Online]. Retrieved from the Internet: <URL: http://web.archive.org/web/20000830150100/http://www.auctionwatch.com>, (Aug. 15, 2000), 30 pgs.
"AuctionWatch.com", [Online]. Retrieved from the Internet: <URL: http://web.archive.org.web/20011217190108/wsacp.auctionwatch.com/login.html?ret=/my/acp/>, (Dec. 17, 2001), 19 pgs.
"Blackthorne Products Page", [Online], Retrieved from the Internet: <URL: http://web.archive.org/web/19990508065201/www.blackthornesw.com/Bthorne/products>, (1999), 2 pgs.
"Chinese Application Serial No. 02824589, First Office Action dated Mar. 23, 2007", with English translation of claims, 31 pgs.
"Chinese Application Serial No. 02824589, Office Action dated Mar. 23, 2007", with English translation of claims, 16 pgs.
"Chinese Application Serial No. 02824589, Second Office Action dated Dec. 28, 2007", with English translation of claims, 7 pgs.
"Chinese Application Serial No. 02824589.X , Response filed Mar. 1, 2008 to Office Action dated Dec. 28, 2007", with English translation of claims, 16 pgs.

(56) References Cited

OTHER PUBLICATIONS

"Chinese Application Serial No. 02824589.X , Response filed Aug. 7, 2007 to Office Action dated Mar. 23, 2007", with English translation of claims, 31 pgs.
"Chinese Application Serial No. 03813485.3, Office Action dated Jan. 9, 2009", with English translation of claims, 9 pgs.
"Chinese Application Serial No. 03813485.3, Office Action dated Jun. 24, 2010", with English translation of claims, 9 pgs.
"Chinese Application Serial No. 03813485.3, Office Action dated Sep. 25, 2009", with English translation of claims, 15 pgs.
"Chinese Application Serial No. 03813485.3, Re-examination Decision dated Nov. 29, 2010", with English translation of claims, 18 pgs.
"Chinese Application Serial No. 03813485.3, Response flied May 25, 2009 to Office Action dated Jan. 9, 2009", with English translation of claims, 9 pgs.
"Chinese Application Serial No. 03813485.3, Response to Notification of Reexamination Filed: Aug. 9, 2010", with English translation of claims, 23 pgs.
"Chinese Application Serial No. 201110049654.X—Rejection Decision dated Nov. 5, 2012", with English translation of claims, 16 pgs.
"Chinese Application Serial No. 201110049654.X, Office Action dated Jan. 4, 2015"°, with English translation of claims, 18 pgs.
"Chinese Application Serial No. 201110049654.X, Office Action dated Jan. 5, 2012", With English Translation, 10 pgs.
"Chinese Application Serial No. 201110049654.X, Office Action dated Jul. 10, 2014", with English translation, 18 pgs.
"Chinese Application Serial No. 201110049654.X, Office Action dated Jul. 11, 2012", with English translation of claims, 10 pgs.
"Chinese Application Serial No. 201110049654.X, Office Action dated Sep. 10, 2014", with English translation of claims, 15 pgs.
"Chinese Application Serial No. 201110049654.X, Response filed Feb. 18, 2013", 5 pgs.
"Chinese Application Serial No. 201110049654.X, Response filed May 21, 2012 to Office Action dated Jan. 5, 2012", with English translation of claims, 13 pgs.
"Chinese Application Serial No. 201110049654.X, Response filed Sep. 26, 2012 to Office Action dated Jul. 11, 2012", 3 pgs.
"Chinese Application Serial No. 201110049654.X, Response filed Nov. 25, 2014 to Office Action dated Sep. 10, 2014", with English translation of claims, 18 pgs.
"DHL and UPS offer country-specific services", Transportation and distribution, vol. 38, Iss. 12, (Dec. 1997), 18.
"European Application Serial No. 01959319.3, Office Action dated May 15, 2007", 3 pgs.
"European Application Serial No. 01959319.3, Response filed Nov. 23, 2007 to Office Action dated May 15, 2007", 23 pgs.
"European Application Serial No. 01959319.3, Summons to Attend Oral Proceedings mailed Jul. 13, 2012", 3 pgs.
"European Application Serial No. 02723169.5 Response filed Jun. 14, 2011 to Office Action dated Feb. 15, 2011", 12 pgs.
"European Application Serial No. 02723169.5, Examination Notification Art. 94(3) dated Mar. 17, 2014", 7 pgs.
"European Application Serial No. 02723169.5, Office Action dated Feb. 15, 2011", 4 pgs.
"European Application Serial No. 02723169.5, Office Action dated Feb. 20, 2008", 6 pgs.
"European Application Serial No. 02723169.5, Response filed Jul. 17, 2014", 19 pgs.
"European Application Serial No. 02723169.5, Supplementary European Search Report dated Sep. 26, 2006", 3 pgs.
"European Application Serial No. 03757395.3, Office Action dated Oct. 8, 2010", 3 pgs.
"European Application Serial No. 03757395.3, Office Action dated Dec. 8, 2005", 1 pg.
"European Application Serial No. 03757395.3, Office Action dated Dec. 17, 2004", 21 pgs.
"European Application Serial No. 03757395.3, Response filed Feb. 3, 2005 to Office Action dated Dec. 17, 2004", 6 pgs.

"European Application Serial No. 03757395.3, Response filed Apr. 10, 2012 to Summons to Attend Oral Proceedings mailed Feb. 13, 2012", 20 pgs.
"European Application Serial No. 03757395.3, Response filed Apr. 18, 2011", 9 pgs.
"European Application Serial No. 03757395.3, Search Report dated Sep. 4, 2009", 2 pgs.
"European Application Serial No. 03757395.3, Summons to Attend Oral Proceedings mailed Feb. 13, 2012", 5 pgs.
"Frequently Asked Questions about Mister Lister", [Online]. Retrieved from the Internet: <URL: http://pages.ebay.co.uk/help/sellerguide/mr-lister-faq.html>, (Copyright 1995-2005), 5 pgs.
"Google looking at more Country Specific Domains", Europmedia, (Jan. 17, 2002), 1 pg.
"Hello direct store joins eBay network of merchants", PR Newswire, New York, NY, (May 23, 2002), 2 pgs.
"Indian Application Serial No. 1200/KOLNP/2009, First Examiner Report dated Nov. 23, 2015", in English, 2 pgs.
"Indian Application Serial No. 1200/KOLNP/2009, Response filed Jun. 13, 2016 to First Examiner Report dated Nov. 23, 2015", in English, 19 pgs.
"Indian Application Serial No. 1921/KOLNP/2004, Decision to Grant dated Nov. 18, 2009", 2 pgs.
"Indian Application Serial No. 1921/KOLNP/2004, First Examination Report dated Apr. 7, 2008", 11 pgs.
"Indian Application Serial No. 1921/KOLNP/2004, Response filed Mar. 6, 2009 to Examiner's First Report dated Apr. 7, 2008", 13 pgs.
"International Application Serial No. PCT/US00/17136 International Search Report dated Nov. 16, 2000", 6 pgs.
"International Application Serial No. PCT/US00/17136, International Preliminary Examination Report dated Mar. 13, 2001", 4 pgs.
"International Application Serial No. PCT/US00/17136, International Search Report dated Nov. 16, 2000", 5 pgs.
"International Application Serial No. PCT/US00/32088, International Search Report dated Apr. 4, 2001", 6 pgs.
"International Application Serial No. PCT/US01/02584, International Search Report dated Apr. 16, 2001", 4 pgs.
"International Application Serial No. PCT/US01/04811, International Search Report dated Jun. 28, 2001", 6 pgs.
"International Application Serial No. PCT/US01/12398 International Search Report dated Aug. 27, 2001", 3 pgs.
"International Application Serial No. PCT/US01/23854, International Preliminary Examination Report dated Aug. 19, 2002", 3 pgs.
"International Application Serial No. PCT/US01/23854, International Search Report dated Dec. 28, 2001", 3 pgs.
"International Application Serial No. PCT/US01/23854, International Search Report dated Dec. 28, 2001", 6 pgs.
"International Application Serial No. PCT/US02/04692, International Search Report dated Jun. 12, 2002", 5 pgs.
"International Application Serial No. PCT/US03/17915, Article 34 Amendment filed Dec. 17, 2003", 5 pgs.
"International Application Serial No. PCT/US03/17915, International Preliminary Examination Report dated Mar. 26, 2004", 10 pgs.
"International Application Serial No. PCT/US03/17915, International Search Report dated Nov. 26, 2003", 6 pgs.
"International Application Serial No. PCT/US99/18510, International Search Report dated Oct. 29, 1999", 4 pgs.
"International Application Serial No. PCT/US99/29312, International Search Report dated Apr. 18, 2000", 6 pgs.
"Korean Application Serial No. 2004-7020202, Final Office Action dated Nov. 24, 2009", with English translation of claims, 6 pgs.
"Korean Application Serial No. 2004-7020202, Notice of Decision to Grant dated Feb. 11, 2010", with English translation of claims, 3 pgs.
"Korean Application Serial No. 2004-7020202, Office Action dated Apr. 30, 2009", with English translation of claims, 6 pgs.
"Korean Application Serial No. 2004-7020202, Office Action dated Aug. 29, 2008", with English translation of claims, 17 pgs.
"Korean Application Serial No. 2004-7020202, Preliminary Rejection dated Nov. 30, 2007", with English translation of claims, 19 pgs.

(56) References Cited

OTHER PUBLICATIONS

"Korean Application Serial No. 2004-7020202, Response filed Apr. 30, 2008", with English translation of claims, 75 pgs.
"Korean Application Serial No. 2004-7020202, Response filed Jun. 30, 2009 to Office Action dated Apr. 30, 2009", with English translation of claims, 43 pgs.
"Korean Application Serial No. 2004-7020202, Response filed Dec. 24, 2009 to Final Office Action dated Nov. 24, 2009", with English translation of claims, 36 pgs.
"Korean Application Serial No. 2004-7020202, Response filed Dec. 29, 2008", with English translation of claims, 68 pgs.
"Korean Application Serial No. 2004-7020202, Voluntary Amendment filed Oct. 20, 2006", 260 pgs.
"Korean Application Serial No. 2009-7027103, Final Office Action dated Sep. 28, 2010", with English translation of claims, 5 Pgs.
"Korean Application Serial No. 2009-7027103, Notice of Decision to Grant dated Feb. 14, 2011", with English translation of claims, 2 pgs.
"Korean Application Serial No. 2009-7027103, Office Action dated, Mar. 26, 2010", with English translation of claims, 9 pgs.
"Korean Application Serial No. 2009-7027103, Response filed May 26, 2010 to Office Action dated Mar. 26, 2010", with English translation of claims, 29 pgs.
"Korean Divisional Application Serial No. 2009-7027103, Appeal Filed Dec. 29, 2010 to Final Office Action dated Sep. 28, 2010", with English translation of claims, 42 pgs.
"New eBay-like auction software released", Business Wire, Business Editors/High-Tech Writers; Business Wire; New York, (Mar. 17, 1999), 2 pgs.
"Onsale Joins Fray as Online Shopping Picks Up Speed: Internet Booms", Computer Reseller News, CMP Publications, Inc., USA, (Jun. 5, 1995), 1 pg.
"Onsale: Onsale Brings Thrill of Auctions and Bargain Hunting Online; Unique Internet retail service debuts with week-long charity auction for The Computer Museum in Boston", Business Wire, Dialog Web. 0489267 BW0022, (May 24, 1995), 3 pgs.
"Photodisc localizes Internet presence to better serve global markets;Adds country-specific content and languages to its Award-wining Websites", Business Wire, (May 27, 1998), 3 pgs.
"Stamp.com Launches New iShip Service Offering to Automate Office-Based Shipping", PR Newswire, PQDialog #448531788, (Jun. 14, 2000), 5 pgs.
"Stamp.com Launches New iShip Service Offering to Automate Office-Based Shipping", PR Newswire, PQDialog #448531788, (Jun. 14, 2000), 7 pgs.
"Stamps.com Becomes the Standard in Internet Mailing and Shipping for Top Auction Resource and Trading Sites", Stamps.com: PR Newswire Mar. 15, 2000, PQDialog #449383612, [Online]. Retrieved from the Internet: <URL: http://search.proquest.com/professional/docview/449383612?accountid=161862>, (Mar. 15, 2000), 6 pgs.
"Thin Client", (c) Wikipedia, [Online]. Retrieved from the Internet: <URL:http://en.wikipedia.org/wiki/Thin_client>, (Accessed Feb. 15, 2008), 13 pgs.
"Thin Client Computing", [Online]. Retrieved from the Internet: <URL: http://web.archive.org/web/20040122033629/http://www.thinclient.net>, (Jan. 22, 2004), 24 pgs.
"Yahoo Homepage", Internet Archive Wayback Machine, http://web.archive.org/web/19991003015603/http://www.yahoo.com/index.html, (Oct. 3, 1999), 1 p.
"Yahoo!—Regional: Countries: Afghanistan", Copyright © 1994-97 Yahoo! Inc., [Online]. Retrieved from the Internet: <URL: http://web.archive.org/web/20060921181441/http://dir.yahoo.com/Regional/countries/afghanistan>, (Jun. 16, 1997), 1 pg.
"Yahoo!—Regional: Countries: Sweden", Copyright © 1994-97 Yahoo! Inc., [Online]. Retrieved from the Internet: <URL: http://web.archive.org/web/19970616194441/www.yahoo.com/Regional/Countries/Sweden/>, (Jun. 16, 1997), 2 pgs.

"Yahoo! Auctions Celebrates One-Year Anniversary; As Online Auction Usage Continues to Grow, Yahoo! Is Quickly Becoming the World Marketplace of the New Millennium", Business Wire, (Sep. 14, 1999), 3 pages.
"Yahoo! Launches Yahoo! Pay-direct for Online Person-to-Person Payments; Relationship With CIBC National Bank Allows Consumers to Easily Send and Receive Payments Via Email", Business Wire, PQ Dialog #445932440, (Jul. 31, 2000), 4 pgs.
"Yahoo! Launches Yahoo! PayDirect for Online Person-to-Person Payments; Relationship with CI BC National Bank Allows Consumers to Easily Send and Receive Payments Via Email", Business Editors & High-Tech Writers. Business Wire, [Online], Retrieved from the Internet: <URL: http://search.proquest.com/professional/docview/445932440?accountid=161862>, (Jul. 31, 2000), 5 pgs.
Akin, David, "Web retailing gains market muscle as concerns fade: Record season: Increasing number of sites catering for Canadian dollars", Financial Post, p04, XP002905105, (Dec. 26, 1998), 3 pages.
Alice, Michele, "eBay's 'Mister Lister' Auction Management Software", Auctionbytes-Update, No. 22, [Online]. Retrieved from the Internet: <URL: http://www.auctionbytes.com/cab/abu/y200/m09/abu0022/s05>, (Sep. 24, 2000), 3 pgs.
Auctionwatch.com, et al., "", Prima Publishing, Roseville, CA. ISBN 0-7615-2999-3 AuctionWatch.com's Official Guide to Online Buying and Selling: Professional Tips, Tactics and Techniques at Your Fingertips., (2000), 307 pgs.
Auctionwatch.com, et al., "AuctionWatch CD", Prima Publishing, Roseville, CA. AuctionWatch.com's Official Guide to Online Buying and Selling: Professional Tips, Tactics and Techniques at Your Fingertips., (2000).
Baumann, G. W, "Personal Optimized Decision/Transaction Program", IBM Technical Disclosure Bulletin, (Jan. 1995), 83-84.
Bidnbuy, "Going, going, virtually gone . . . ", Business and Finance Dialog File 20#06012646, (Jun. 17, 1999), 3 pgs.
Business Wire, "Bay Builder Releases Major Innovation for Online Wireless Auctions.", Recovered via Dialog Database on Feb. 15, 2008, (Mar. 10, 2000), 2 pgs.
Business Wire, "Mediappraise Receives National Award for Web-based Technology That Enables Companies to Solve Thorny HR Problem", Business Wire, (Dec. 14, 1998), 1-2.
Business Wire, "Subasta.com Enters Into Strategic Partnership with From2.com", Business Wire, Obtained from Proquest, Document No. 43206061, (Jul. 16, 1999), 2 pages.
Business Wire, "Subasta.com, the Premier Online Auction Board for Latin America, Spain, and the Hispanic Sector of the U.S., Has Attracted Over 60,000 Viewers in Less Than Two Months!", Business Wire, (Jul. 16, 1999), 2 pages.
Business Wire, "Yahoo! Launches Three New European Auctions Services; Yahoo! Italy, Yahoo! Spain and Yahoo! Sweden Unveil New Local Auctions", Business Wire, Obtained from Proquest, Document No. 45061209, (Sep. 23, 1999), 3 pages.
Clemons, E., "Evaluating the prospects for alternative electronic securities", Proceedings of ICIS 91: 12th International Conference on Information Systems, (Dec. 16-18, 1991), 53-63.
Collete, Stacy, "Thin Clients Pull in Car Customers: Auto Auction company eyes move to Web.(Industry Trend or Event)", Computerworld recovered via dialog database on Feb. 15, 2008, (Apr. 5, 1999), p. 41(1).
Cooper, C., et al., "Playing Catch-Up: U.S. Web Firms Get Slow Start in Europe, Amid Crowded Field—Used to Being First and Best at Home, They Stumble in World's No. 2 Market—Pouncing on Amazon Delays", Wall Street Journal Europe, Obtained from Proquest, Document No. 46338867, (Nov. 15, 1999), 5 pages.
Graham, Ian, "The Emergence of Linked Fish Markets in Europe", Electronic Markets. vol. 8, No. 2, (1998), 29-32.
Grubbs, L., "Top 5 auction utilities", PC World.com, San Francisco, CA, (Dec. 4, 2000), 2 pgs.
Hansell, Saul, "Meg Whitman and eBay, Net Survivors", New York Times, (May 5, 2002), 5 pgs.
Hauser, R., "Anonymous Delivery of Goods in Electronic Commerce", IBM Technical Disclosure Bulletin, 39(3), (Mar. 1996), 363-366.

(56) References Cited

OTHER PUBLICATIONS

Hess, C. M, et al., "Computerized Loan Organization System: An Industry Case Study of the Electronic Markets Hypothesis", MIS Quarterly, vol. 18(3), (Sep. 1994), 251-275.
Hutchinson, Art, "E-Commerce: Building a Model", Art. Communications Week recovered via Dialog Database on Feb. 15, 2008., (Mar. 17, 1997), p. 57.
Klein, Stefan, "Introduction to Electronic Auctions", Focus Theme, vol. 7, No. 4, (1997), 3-6.
Lassila, Ora, "Web metadata; A Matter of Semantics", IEEE Internet Computing, v2i4pg30 Proquest #1424143061, (1998), 15 pgs.
Lee, H. G, "Electronic brokerage and electronic auction: the impact of IT on market structures", Proceedings of the Twenty-Ninth Hawaii International Conference on System Sciences, vol. 4, (1996), 397-406.
Lee, Ho Geun, "AUCNET: Electronic Intermediary for Used-Car Transactions", Focus Theme, Electronic Markets, vol. 7, No. 4, (1997), 24-28.
M2 Presswire, "HP completes online strategy with launch of e-commerce site", Proquest#43225990, (Jun. 29, 1999), 3 pgs.
M2 Presswire, "United Technologies: UTC's Carrier Corp, teams with FreeMarkets to create largest Asian-based B2B online auction market to date; UTC Division identifies average annual savings of more than 16 percent on electric motors through FreeMarkets B2B eMarketpla", M2 Presswire, (Mar. 22, 2000), 2 pages.
Malone, T., et al., "Electronic Markets and Electronic Hierarchies", Communications of the ACM, vol. 30, No. 6, (Jun. 1987), 484-497.
Mardesich, Jodi, "Site Offers Clearance for End-of-Life Products—Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
McClenahen, John, "Net Gains", Industry Week, Cleveland. vol. 248, Iss. 10, [Online]. Retrieved from the Internet: <URL: http://proquest.umi.com/pgdweb?index=O&did=41808971&SrchMode=1&sid=5&Fmt=4& V . . . >, (May 17, 1999), p. 51.
Meade, J., "Visual 360: A Performance Appraisal System That's 'Fun'", HR Magazine, Society for Human Resource Management, (Jul. 1999), 3 pgs.
Merrill, K., "GE Capital to Extend Integrator Buying Spree", Computer Reseller News, (Jul. 1996), pp. 2 and 32.
Morin, Lee M.E., "Multilingual Communications Device", U.S. Appl. No. 08/200,049, filed Feb. 22, 1994, (Mar. 2, 2004), 7 pgs.
Neo, B. S, "The implementation of an electronic market for pig trading in Singapore", Journal of Strategic Information Systems; vol. 1(5), (Dec. 1992), 278-288.
Post, D. L, et al., "Application of auctions as a pricing mechanism for the interchange of electric power", IEEE Transactions on Power Systems, 10(3), (Aug. 1995), 1580-1584.
PR Newswire Europe Ltd., "Mitsubishi Venture, Wells Fargo Partner to Offer Multi-Currency E-Commerce Storefront", PR Newswire, Obtained from Proquest, Document No. 39345965, (Mar. 1, 1999), 3 pages.
Preist, Chris, et al., "Adaptive Agents in a Persistent Shout Double Auction", International Conference on Information and Computation Economies, Proceedings of the first international conference on Information and computation economies, (1998), 11-18.
Pressler, Margaret, "Sells on eBay; Housewife finds herself head of multinational software firm", Washington Post, Proquest # 44484325, (Sep. 5, 1999), 3 pgs.
Reck, Martin, "Trading-Process Characteristics of Electronic Auctions", Focus Theme, vol. 7, No. 4, (1997), 17-23.
Resnick, Paul, "Reputation systems", Communications of the ACM, 43(12), (Dec. 2000), 45-48.
Rockoff, T. E, et al., "Design of an Internet-based system for remote Dutch auctions", Internet Research: Electronic Networking Applications and Policy, vol. 5(4), (Jan. 1, 1995), 10-16.
Schmid, B. F, "The Development of Electronic Commerce", EM—Electronic Markets, No. 9-10, (Oct. 1993), 2 pgs.
Schneider, G. M, et al., "An Introduction to Programming and Problem Solving with Pascal", An Introduction to Programming and Problem Solving with Pascal, Second Edition, John Wiley & Sons, Inc., New York, (1982), 3 Pages.
Siegmann, Ken, "Nowhere to go but up", PC Week; vol. 12(42), Ziff-Davis Publishing Company, (Oct. 23, 1995), 1-3.
Tak, Y., et al., "The SIFT Information Dissemination System", ACM Transactions on Database Systems. vol. 24, Issue 4. ACM Press, (Dec. 1999), 529-565.
Tapscott, D., "eBay endagners traditional papers auctioneer can pack far more punch in your sales pitch", National Post, Proquest# 54945579, (Oct. 9, 1999), 3 pgs.
Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.
Turban, Efraim, "Auctions and Bidding on the Internet: An Assessment", Focus Theme, EM—Electronic Markets, vol. 7, No. 4, (1997), 7-11.
Van Heck, E., et al., "Experiences with Electronic Auctions in the Dutch Flower Industry", Focus Theme, Erasmus University, The Netherlands, (1996), 6 pgs.
Warbelow, A, et al., "Aucnet: TV Auction Network System", Harvard Business School Case/Study, HBVR#9-190-001, USA, (Jul. 1989), 1-16.
Wilson, D., "Going . . . Going . . . Gone! Bargain-hunters and collectors can scour auctions from home via the internet", The Gazette, Proquest #4116732, (Apr. 27, 1999), 4 pgs.
Wilson, T., "Act Globally, Think Locally", InternetWeek, Issue 789, Obtained from Proquest, Document No. 46352181, (Nov. 15, 1999), 4 p.
Zwass, V., "Electronic Commerce: Structures and Issues", International Journal of Electronic Commerce, Fall 1996, vol. 1, No. 1, (Fall 1996), 3-23.
"U.S. Appl. No. 14/268,986, Examiner Interview Summary dated May 15, 2017", 3 pgs.
"U.S. Appl. No. 14/268,986, Non Final Office Action dated Feb. 10, 2017", 18 pgs.
"U.S. Appl. No. 14/268,986, Response filed May 10, 2017 to Non Final Office Action dated Feb. 10, 2017", 30 pgs.
"U.S. Appl. No. 14/790,661, First Action Interview—Pre-Interview Communication dated May 18, 2017", 4 pgs.
"U.S. Appl. No. 14/942,213, Final Office Action dated Apr. 21, 2017", 13 pgs.
"U.S. Appl. No. 14/942,213, Notice of Allowance dated Jul. 13, 2017", 12 pgs.
"U.S. Appl. No. 14/942,213, Response filed Feb. 28, 2017 to Non Final Office Action dated Nov. 30, 2016", 9 pgs.
"U.S. Appl. No. 14/942,213, Response filed Jun. 21, 2017 to Final Office Action dated Apr. 21, 2017", 7 pgs.
"Business Roundup", Internet Week, (Apr. 5, 1999), 1 page.
"Exchange of Ideas: Why the street is in love with Purchasepro.com's congeries of revenue models", (Mar. 1, 2000), 2 pages.
"Family of Web Rental Applications Unveiled", KMWorld, 7(1), (Jan. 1, 1998), 2 pages.
"Government agencies can procure materials", Link-up, 17(1), (Jan. 1, 2000), p. 19.
"Service helps hospitals shop online", Link-up, (May Jun. 2000), p. 14.
"Web Beacon", Webopedia, (Aug. 21, 2003), 3 pages.
"Welcome to the Sloan Career Development Office Interview Bidding and Scheduling System", CDO Interview Bidding and Scheduling—Login, [Online]. Retrieved from the Internet: URL: file: 1 Bstz-tkgukobdl5 CLIENTS EBA Y P1 07 Prior%20Art CD0% 20Interview%20Bidd . . . , (Accessed Mar. 25, 2004), 3 pages.
"Continental Airlines ShopOnePass", Copyright 2002 Continental Airlines, Inc., [Online]. Retrieved from the Internet: URL: file: Bstz-tkgukobdi5 CLIENTS_A_M EBAY P1 07 Prior0) o2oArt Continental0 o20Airlines0 o . . . , (Accessed Jul. 28, 2004), 1 page.
"Requesting a Reward", Continental Airlines OnePass—Requesting a Reward, [Online]. Retrieved from the Internet: URL: file: Bstz-tkgukobdl5 CLIENTS_A_M EBAY P107 Prior%20Art Rewards2_ files onepass_fr_main_files r . . . , (Accessed Jul. 28, 2004), 2 pages.

(56) References Cited

OTHER PUBLICATIONS

"OnePass Online Auction", Copyright 2002 Continental Airlines, Inc., [Online]. Retrieved from the Internet: URL: file: 1 Bstz-tkgukobdl5 CLIENTS _A_ M EBA Y P I 07 Prior%20Art Copy%20of o200nePass%200nline%2 . . . , (Accessed Jul. 28, 2004), 1 pG.
"Last minute gift ideas and stocking stuffers from ATandT", ATandT News Release, [Online]. Retrieved from the Internet: URL: http: www.att.com news 1294 941221.csa.html, (Dec. 21, 1994), 2 pages.
"Keeping You Informed", transferred inCanadian membership guide, www.cdnair.ca, 6-7.
"Continental Airlines OnePass—Interactive Reward Charts", [Online]. Retrieved from the Internet: URL: ile: 1 Bstz-tkgukobdiS CLIENTS_ A_M EBA Y P1 07 Prior0 o20Art Copy0 o20of0 o20Rewards . . . , (Accessed Jul. 22, 2004), 8 pgs.
"Aviation Competition: Effects on Consumers from Domestic Airline Alliances Vary", [Online]. Retrieved from the Internet: URL: http: groups.google.com groups?q=mileage+combine+redeemandhl= enandlr=andie=UTF-8andoe=UTF-8andselm=GAORPTrc99037. txtp2%40us.govnews.organdmum=6, (Feb. 2, 1999), 25 pages.
"@wards online", Canadian Airlines, Copyright (c) 1994-1997— Canadian Airlines International Ltd., [Online]. Retrieved from the Internet: URL: http: web.archive.org web 19970704234541 www. cdnair.ca cpi.html, (1994), 1 page.
"Ebay—Your Personal Trading Community", [Online]. Retrieved from the Internet: URL: http: web.archive.org web 19991007062815 www.ebay.com, (Oct. 1999), 23 pgs.
"Auctionwatch", [Online]. Retrieved from the Internet: URL: http: web.archive.org web 20000830150100 http: www.auctionwatch. com, (Aug 15, 2008), 46 pgs.
"Turbo Lister Listing Activity Quick Start Guide", eBay, (Apr. 2007), 8 pgs.
"NEW eBay Turbo Lister 2 Quick Start Guide", eBay, (Feb. 2006), 5 pgs.
"U.S. Appl. No. 14/790,661, First Action Interview—Office Action Summary dated Aug. 8, 2017", 5 pgs.
"U.S. Appl. No. 14/268,986, Final Office Action dated Sep. 11, 2017", 21 pgs.
"U.S. Appl. No. 14/790,661, Response to First Action Interview Office Action Summary filed Dec. 7, 2017", 13 pgs.
"U.S. Appl. No. 14/790,661, Final Office Action dated Feb. 9, 2018", 8 pgs.
"U.S. Appl. No. 14/790,661, Response filed Apr. 6, 2018 to Final Office Actin dated Feb. 9, 2018", 8 pgs.
"U.S. Appl. No. 14/790,661, Notice of Allowance dated Apr. 24, 2018", 5 pgs.
"Non-Final Office Action received for U.S. Appl. No. 14/942,213, dated Nov. 16, 2017", (Nov. 16, 2017), 16 pages.
"Response to Non Final Office Action filed on Feb. 14, 2018, for U.S. Appl. No. 14/942,213, dated Nov. 16, 2017", (Feb. 14, 2018), 14 pages.
"Notice of Allowance received for U.S. Appl. No. 14/942,213, dated Mar. 26, 2018", (Mar. 26, 2018), 11 pages.
"Preliminary Amendment filed for U.S. Appl. No. 13/489,646, dated Apr. 17, 2013", (Apr. 17, 2013), 30 pages.
Brown, Janelle, "What does it take to make a buck off of Usenet?", salon.com Technology,, [Online]. Retrieved from the Internet: URL: www.salon.com tech feature May 24, 1999 deja, (May 24, 1999), 4 pages.
Furger, Roberta, "Working the Web Bazaar", PC World magazine, (May 2000), 10 pages.
Mollman, Steve, "Sold! Never pay retail again. Online auctions are changing the way businesses buy and sell everything", PC Computing, (Feb. 2000), 131-151.
Pacek, Greg, "American Express Membership Rewards: A Good Deal or Not?", [Online]. Retrieved from the Internet: URL: http: groups.google.com groups?q=combine+points+programsandhl= enandlr=andie=UTF-8andoe=UTF-8andselm=crazyone-2509972357090001%40async83.city-net.comandmum=4, (Sep. 25, 1997), 2 pages.
Pollick, M., "Sold! on eBay: As antique and collectible dealers see their sales increase through online auctions such as eBay, more of them are deciding that the internet is not something to be afraid of", Sarasota Herald Tribune, Obtained from Proquest, Document No. 45499060, (Oct. 11, 1999), 8 pages.
Roberson, G.W., "AA US Alliance Question", [Online]. Retrieved from the Internet: URL: http: groups.google.comq=mileage+combine+ redeemandhl=enandlr=andie=UTF-8andoe=UTF-8andselm=6s1oa8% 24v66%241%40nnrp1.dejanews.comandmum=9, (Aug. 26, 1998), 1 page.
Seminerio, Maria, "When You Gotta Take Stock", EWeek, http: www.eweek.com article2 0%2C1759%2C1243705%2C00.asp, (Dec. 11, 2000), 2 pages.
Staff, Newsbytes, "Biz to Biz Buzz", Newsbytes PM, (May 24, 2000), 2 pages.
Tadjr, "Delta . . . a long relationship ends", [Online]. Retrieved from the Internet: URL: http: groups.google.comgroups?q=mileage+ combine+redeemandhl=enandlr=andie=UTF-8andoe=UTF-8andselm= 7adhof%24me8%241%40news-1.news.gte.netandmum=5, (Feb. 17, 1999), 1 page.
Wilson, Tim, "Hubs Rate Poorly on Feature Depth", http: www. internetweek.com lead lead100900. htmInternetWeek.com, (Oct. 9, 2000), 4 pages.
Winship, Tim, "Combinable Miles Are the Stuff of Frequent Flyers' Dreams", FrequentFlier.com-helping frequent flyers earn more miles and travel awards through free . . . , transferred in, (May 25, 1998), 4 pages.
Advisory Action received for U.S. Appl. No. 09/563,069, dated Oct. 24, 2002, 3 pages.
Examiner Initiated Interview Summary received for U.S. Appl. No. 09/563,069, dated Aug. 12, 2002, 2 pages.
Final Office Action received for U.S. Appl. No. 09/563,069, dated Jun. 4, 2002, 11 pages.
Non-Final Office Action received for U.S. Appl. No. 09/563,069, dated Nov. 21, 2001, 23 pages.
Notice of Allowance received for U.S. Appl. No. 09/563,069, dated Jan. 28, 2003, 7 pages.
Response to Final Office Action filed on Oct. 4, 2002, for U.S. Appl. No. 09/563,069, dated Jun. 4, 2002, 15 pages.
Response to Non-Final Office Action filed on Jan. 16, 2002, for U.S. Appl. No. 09/563,069, dated Nov. 21, 2001, 23 pages.
Reply Brief Acknowledgment received for U.S. Appl. No. 09/602,110, dated Aug. 18, 2010, 2 pages.
Response to Appeal Decision filed on Jul. 19, 2013 for U.S. Appl. No. 09/602,110, dated May 29, 2013, 19 pages.
Response to Decision on Appeal filed on Oct. 25, 2010 for U.S. Appl. No. 10/252,126, dated Sep. 15, 2010, 11 pages.
Response to Final Office Action and Advisory Action filed on Jun. 14, 2010 for U.S. Appl. No. 10/252,127, dated Jan. 7, 2010 and Mar. 29, 2010, 15 pages.
Response to Decision on Appeal filed on Mar. 28, 2013 for U.S. Appl. No. 10/252,128, dated Jan. 31, 2013, 9 pages.
312 Amendment for U.S. Appl. No. 10/319,034, filed Jun. 25, 2004, 3 pages.
Notice of Allowance received for U.S. Appl. No. 10/319,034, dated Apr. 6, 2004, 7 pages.
Final Office Action received for U.S. Appl. No. 10/600,861, dated Jan. 12, 2006, 6 pages.
Non-Final Office Action received for U.S. Appl. No. 10/600,861, dated Aug. 16, 2004, 7 pages.
Non-Final Office Action received for U.S. Appl. No. 10/600,861, dated May 17, 2005, 6 pages.
Notice of Allowance received for U.S. Appl. No. 10/600,861, dated Jun. 29, 2006, 4 pages.
Response to Final Office Action filed on Jun. 12, 2006 for U.S. Appl. No. 10/600,861 dated Jan. 12, 2006, 8 pages.
Response to Non-Final Office Action filed on Dec. 20, 2004 for U.S. Appl. No. 10/600,861 dated Aug. 16, 2004, 8 pages.
Response to Non-Final Office Action filed on Sep. 2, 2005 for U.S. Appl. No. 10/600,861 dated May 17, 2005, 8 pages.
Non-Final Office Action received for U.S. Appl. No. 11/558,291, dated Jul. 28, 2008, 6 pages.

(56) References Cited

OTHER PUBLICATIONS

Notice of Allowance received for U.S. Appl. No. 11/558,291, dated Jan. 6, 2009, 4 pages.
Response to Non-Final Office Action filed on Oct. 31, 2008, for U.S. Appl. No. 11/558,291, dated Jul. 28, 2008, 9 pages.
Non-Final Office Action received for U.S. Appl. No. 12/416,088, dated May 27, 2011, 7 pages.
Notice of Allowance received for U.S. Appl. No. 12/416,088, dated Nov. 16, 2011, 5 pages.
Preliminary Amendment received for U.S. Appl. No. 16/050,424, filed Oct. 31, 2018, 7 pages.
International Search Report received for PCT Patent Application No. PCT/US2001/013253, dated Jul. 31, 2001, 1 page.
Response to Non-Final Office Action filed on Aug. 25, 2011, for U.S. Appl. No. 12/416,088, dated May 27, 2011, 10 pages.
"Microsoft Computer Dictionary, 5th edition", 1 page.
"Peerflix: How it Works", Copyright 2004-2006 Peerflix, Inc., [Online]. Retrieved from the Internet: URL: http: www.peerflix.com Default.aspx?tabid=64, (Accessed Aug. 14, 2006), 2 pgs.
"Peerflix: Netflix, Blockbuster and Peerflix: Compare Online DVD Rentals vs. Buying vs. Trading", Copyright 2004-2006 Peerflix, Inc., [Online]. Retrieved from the Internet: URL: http: www.peerflix.com Default.aspx?tabid=171, (Accessed Aug. 14, 2006), 2 pgs.
"BarterBee.com: Points Q and A", [Online]. Retrieved from the Internet: URL: http: www.barterbee.com xmain0003 ?_hp=point, (Accessed Aug. 14, 2006), 1 pg.
"BarterBee.com: Help and FAQ", [Online]. Retrieved from the Internet: URL: http: www.barterbee.com xmain0005 ?_hp=faq_4_requesting, (Accessed Aug. 14, 2006), 2 pgs.
"BarterBee.com: Buy, Sell, Why Points?", [Online]. Retrieved from the Internet: URL: http: www.barterbee.com xmain0003 ?_hp=trade, (Accessed Aug. 14, 2006), 1 pg.
"OED Online Main entry text Frame", [Online]. URL: http: dictionary.oed.com cgi entry_main 50218727?query_type=wordandqueryword=selectandfirst=1andmax_to show+10andsort at Http: dictionary.oed.com cgi entry_main 50218727?query_type=wordandqueryword=approveandfirst=1andmax_to show+10andsort, (Accessed Apr. 14, 2008), 8 pgs.
"PSINet Teams with WorldPay Ltd. to Launch the World's First Secure Multi-Currency Solution for International Electronic Commerce", PR Newswire Association, (Oct. 6, 1997), 3 pgs.
"RSA signs deal with China", Internet Week, 2(7), (Feb. 12, 1996), 2 pgs.
"Robocopy.exe Robust File Copy Utility Version XP010", (2003), 1-35.
Asbrand, Deborah, "Taking Stock in Trading Exchanges", [Online]. Retrieved from the Internet: URL: http: www.reed-electronics.com eb-mag index.asp?layout=articlePrintandarticleID=CA42124, (Apr. 1, 2000), 5 pgs.
Bers, Joanna Smith, "Cyberspace: The new promised land", Bank Systems and Technology, 32(7), (Jul. 1995), 32-37.
Blackthorne, "Ebay Blackthorne: The Officical Guide", (Oct. 10, 2005), 361 pgs.
Chan, H. C., "Design and implementation of a mobile agent-based auction system", Communications, Computers and signal Processing, 2001. PACRIM. 2001. IEEE Pacific Rim Conference, vol. 2, (Aug. 26-28, 2001), 740-743.
Chapman, Robert L, "Roget's International thesaurus fourth edition", sec 637, Thomas Y Crowell, Publishers New York, (1977), 3 pgs.
Chen, Jian, "Bidder's strategy under group-buying auction on the Internet", Systems, Man and Cybernetics, Part A, IEEE Transactions on, vol. 32 Issue: 6, (Nov. 2002), 680-690.
Cohen, Jackie, "Citibank's Bid to Be the King of Cash (Citibank unveils Electronic Monetary System prototype, a digital currency system capable of replacing all current monetary systems)", Bank Technology News, 9(9), (Sep. 1996), p. 9+.
Creed, Adam, "Haggling Online in the Philippines—Magtawaran Auction site—Company Business and Marketing—Brief Article", Newsbytes News Network, http: www.findarticles.com p articles mi_m0NEW is_2000_May_1ai_61859593, (May 1, 2000), Web Page.
Dalton, Gary, "Going, Going, Gone!—E-commerce is leading to an anything-goes environment of online bidding and dynamic pricing", Information Week, http: www.informationweek.com 755 auction.htm, (Oct. 4, 1999), 4 pages.
Davidow, Emily, "The dynamics of pricing", Home Textiles Today, (Feb. 2000), p. 42.
Edwards, Mark, "Your Web Browser is Bugged", Windows IT Pro, http: www.windowsitpro.com WindowsSecurity Article ArticleID 9543 WindowsSecurity_9543.html, (Jul. 13, 2000), 3 pages.
Edwards, Morris, "New B2B player spreads benefits of e-commerce", Communications News, (Jan. 2001), 4 pages.
Fisher, Dennis, "More Goods on the Block", EWeek, (Dec. 2000), 4 pages.
Franse, Karen, "Distribution Briefs—Are Auctions in Vogue?", VARBusiness, http: www.varbusiness.com sections strategy strategy.jhtml?articleId=18828086, (Mar. 11, 2002), 2 pgs.
Goldsborough, Reid, "Internet Auctions Examined", Link-Up, 17, (Nov. Dec. 2000), p. 24.
Goldstein, D E, "Medical E-procurement-navigating in a B2B Market", Health Management Technology, 21(8), (Aug. 2000), 30-6.
Greengard, Samuel, "What Traffic Will Bear", http: www.businessfinancemag.com magazine archives article. html?articleID=13725BusinessFinanceMag.com, (Mar. 2001), 4 pages.
Gupta, Pankaj, "Most Flexible FF?", Google Groups, (Oct. 29, 1996), 2 pages.
Jaroneczyk, Jennifer, "Sold on an Old Idea", Internet World Magazine, (Feb. 15, 2001), 3 pages.
Kalin, Sari, "Mar. 2001", Darwin Magazine, http: www.darwinmag.com read 040101 low.html, (Apr. 2001), 5 pages.
Kumar, Manoj, "Sales Promotions on the Internet", Proceedings of the Usenix Conference on E-commerce, (1998), 1-11.
Lee, Pui-Mun, "Considering exchange rate movements in economic evaluation of foreign direct investments", Engineering Economist, 40(2), (Winter, 1995), 171-199.
Lindsay, Jeff, "The Historic Use of Computerized Tools for Marketing and Market Research: A Brief Survey", Published as Document 6359D at IP.com, (Dec. 27, 2001), 20 pages.
McDougall, Bruce, "Electronic evolution", Canadian Banker, 102(5), (Sep.-Oct. 1995), p28(6).
McKendrick, Joseph, "Old Economy Players Step Up", EC World, (Nov. 2000), 35-44.
Merlino, Laurel, "Auction Anxiety", Upside Today, (Oct. 2000), 247-251.
Mitchell, Lori, "BayBuilder delivers easy, profitable reverse auctions", Infoworld, http: www.infoworld.com articles eu xml 00 06 05 000605eubaybuilder.html, (Jun. 2, 2000), 6 pages.
Mollison, Caitlin, "America West Airlines opt for reverse auctions", Internet World, 8(4), (Apr. 1, 2002), 42(3).
Mollman, Steve, "Are you ready to bicker over the price of that sandwich? In the new economy you won't pay retail for anything.", PC Computing, (Jan. 1, 2000), 8-10.
Morgan, Lisa, "Pick Your Lot: Build consumer-oriented auctions with AuctionBuilder", Internet Week, (Sep. 18, 2000), 4 pages.
Nino, "eBay Blackthorne", (Oct. 10, 2005), 3 pgs.
Ohlson, Kathleen, "Looking behind, beyond B2B marketplace woes", Network World Fusion, http: www.nwfusion.com archive 2001 119669_06-11-2001.html, (Jun. 11, 2001), 4 pages.
Patel, Jeetu, "New Platform Options Fuel E-Commerce", Information Week,, http: www.informationweek.com 779ecommerce.htm, (Mar. 27, 2000), 3 Pages.
Piccinelli, G, "e-service composition: supporting dynamic definition of process-oriented negotiation parameters", 12th International Workshop on Database and Expert Systems Applications, 2001. Proceedings., (Sep. 3-7, 2001), 727-731.
Queree, Anne, "Bid it Out", Global Finance, (Jan. 2000), 36-37.
Reck, M., "Formally Specifying an Automated Trade Execution System", The Journal of Systems and Software, 1993, Elsevier Science Publishing, USA, (1993), 245-252.

(56) References Cited

OTHER PUBLICATIONS

Strassmann, Paul, "The Impact of B2B", Computerworld, (Oct. 2, 2000), 3 pages.
Turek, Norbert, "Online Portals Offer Bandwidth and Voice Services", Information Week, http: www.informationweek.com 784 bandwidth.htm, (May 1, 2000), 4 pages.
Weiss, Scott, "Pan-Am FF Program", Google Groups, (Oct. 16, 1996), 3 pages.
Wilson, Tim, "B2B Sellers Fight Back on Pricing", http: www.internetweek.com lead lead121200.htmInternetWeek.com, (Dec. 12, 2000), 3 pages.
U.S. Appl. No. 09/602,110, filed Jun. 21, 2000, Method and System for Defining and Uploading Multiple Transaction Descriptions From a Client to a Network-Based Transaction Facility.
U.S. Appl. No. 14/595,074, filed Jan. 12, 2015, Method and System for Processing Multiple Transaction Descriptions Received From a Client at a Network-Based Transaction Facility (as amended).
U.S. Appl. No. 12/783,458, U.S. Pat. No. 8,639,829, filed May 19, 2010, System and Method to Facilitate Translation of Communications Between Entities Over a Network.
U.S. Appl. No. 14/165,434 U.S. Pat. No. 9,514,128, filed Jan. 27, 2014, System and Method to Facilitate Translation of Communications Between Entities Over a Network.
U.S. Appl. No. 09/976,301 U.S. Pat. No. 7,752,266, filed Oct. 11, 2001, System and Method to Facilitate Translation of Communications Between Entities Over a Network.
U.S. Appl. No. 10/252,126 U.S. Pat. No. 7,941,348, filed Sep. 20, 2002, Method and System for Scheduling Transaction Listings at a Network-Based Transaction Facility.
U.S. Appl. No. 11/647,728 U.S. Pat. No. 7,895,082, filed Dec. 29, 2006, Method and System for Scheduling Transaction Listings at a Network-Based Transaction Facility.
U.S. Appl. No. 13/080,426 U.S. Pat. No. 8,255,286, filed Apr. 5, 2011, Publishing User Submissions at a Network-Based Facility.
U.S. Appl. No. 13/489,646 U.S. Pat. No. 8,442,871, filed Jun. 6, 2012, Publishing User Submissions.
U.S. Appl. No. 10/252,128 U.S. Pat. No. 8,719,041, filed Sep. 20, 2002, Method and System for Customizing a Network-Based Transaction Facility Seller Application.
U.S. Appl. No. 14/268,986, filed May 2, 2014, Method and System for Customizing a Network-Based Transaction Facility Seller Application.
U.S. Appl. No. 10/252,129, filed Sep. 20, 2002, Method and System for Composing Transaction Listing Descriptions for Use in a Network-Based Transaction Facility.
U.S. Appl. No. 10/252,127 U.S. Pat. No. 8,078,505, filed Sep. 20, 2002, Method and System for Automatically Updating a Seller Application Utilized in a Network-Based Transaction Facility.
U.S. Appl. No. 13/285,916 U.S. Pat. No. 9,092,792, filed Oct. 31, 2011, Customizing an Application.
U.S. Appl. No. 14/790,661, filed Jul. 2, 2015, Customizing an Application.
U.S. Appl. No. 10/831,421 U.S. Pat. No. 9,189,568, filed Apr. 23, 2004, Method and System to Display and Search in a Language Independent Manner.
U.S. Appl. No. 14/942,213, filed Nov. 16, 2015, Method and System to Display and Search in a Language Independent Manner.
U.S. Appl. No. 14/231,639, filed Mar. 31, 2014, Method and System for Listing Items Globally and Regionally, and Customized Listing According to Currency or Shipping Area.
U.S. Appl. No. 14/231,633, filed Mar. 31, 2014, Method and System for Listing Items Globally and Regionally, and Customized Listing According to Currency or Shipping Area.
U.S. Appl. No. 14/231,624, filed Mar. 31, 2014, Method and System for Listing Items Globally and Regionally, and Customized Listing According to Currency or Shipping Area.
U.S. Appl. No. 14/231,613, filed Mar. 31, 2014, Method and System for Listing Items Globally and Regionally, and Customized Listing According to Currency or Shipping Area.
U.S. Appl. No. 09/905,525 U.S. Pat. No. 7,660,740, filed Jul. 13, 2001, Method and System for Listing Items Globally and Regionally, and Customized Listing According to Currency or Shipping Area.
U.S. Appl. No. 12/693,275 U.S. Pat. No. 8,266,016, filed Jan. 25, 2010, Method and System for Listing Items Globally and Regionally, and Customized Listing According to Currency or Shipping Area.
U.S. Appl. No. 13/550,233 U.S. Pat. No. 8,732,037, filed Jul. 16, 2012, Method and System for Providing a Record.
U.S. Appl. No. 14/231,722, filed Mar. 31, 2014, Method and System for Listing Items Globally and Regionally, and Customized Listing According to Currency or Shipping Area.
U.S. Appl. No. 14/231,719, filed Mar. 31, 2014, Method and System for Listing Items Globally and Regionally, and Customized Listing According to Currency or Shipping Area.
U.S. Appl. No. 14/231,706, filed Mar. 31, 2014, Method and System for Listing Items Globally and Regionally, and Customized Listing According to Currency or Shipping Area.
U.S. Appl. No. 14/231,684, filed Mar. 31, 2014, Method and System for Listing Items Globally and Regionally, and Customized Listing According to Currency or Shipping Area.
U.S. Appl. No. 14/231,696, filed Mar. 31, 2014, Method and System for Listing Items Globally and Regionally, and Customized Listing According to Currency or Shipping Area.
U.S. Appl. No. 14/231,650, filed Mar. 31, 2014, Method and System for Listing Items Globally and Regionally, and Customized Listing According to Currency or Shipping Area.
U.S. Appl. No. 16/050,424, filed Jul. 31, 2018, Customizing an Application.
U.S. Appl. No. 10/606,410, filed Jun. 25, 2003, Method to Facilitate a Search of a Database Utilizing Multiple Search Criteria.
Non Final Office Action received for U.S. Appl. No. 16/050,424, dated Dec. 13, 2019, 19 pages.

* cited by examiner

STORED CONSTRUCTS TABLE

| CONSTRUCT ID (62) | CONSTRUCT (64) |
|---|---|
| 0001 | WHAT IS YOUR ADDRESS? |
| 0002 | |
| ⋮ | |

STORED TRANSLATED CONSTRUCTS TABLE

| CONSTRUCT ID (72) | LANGUAGE ID (74) | TRANSLATED CONSTRUCT (76) |
|---|---|---|
| 0001 | FR | |
| 0001 | IT | |
| 0001 | ES | |
| ⋮ | | |

70

FIG. 3B

# SYSTEM AND METHOD TO FACILITATE TRANSLATION OF COMMUNICATIONS BETWEEN ENTITIES OVER A NETWORK

RELATED APPLICATIONS

This application is a continuation of U.S. patent application Ser. No. 14/165,434, filed on Jan. 27, 2014, which is a continuation of U.S. patent application Ser. No. 12/783,458, filed on May 19, 2010, now U.S. Pat. No. 8,639,829, which is a continuation of U.S. patent application Ser. No. 09/976,301, filed Oct. 11, 2001, now U.S. Pat. No. 7,752,266 entitled "SYSTEM AND METHOD TO FACILITATE TRANSLATION OF COMMUNICATIONS BETWEEN ENTITIES OVER A NETWORK," which are incorporated herein by reference in their entireties.

FIELD OF THE INVENTION

The present invention relates generally to the field of network-based communications and, more specifically, to a system and method to facilitate translation of communications between entities over a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, communications between users that utilize different spoken or written languages increase exponentially.

Several attempts have been made to facilitate such communications and to provide translation software packages residing on a computer and configured to translate text or voice communications from one language to another. Some of these translation software packages, however, can be expensive and can result in a financial burden for a user of such software packages. Furthermore, such software packages require considerable storage capacity to be available on the computer.

Another drawback of the translation software packages relates to their limited applicability. For example, current technology allows for translation of text through common text translation software installed on a computer. The translation may be accomplished in a variety of ways, one of which is direct word for word translation of the communication, which is imperfect and produces grammatically incorrect sentences in the translated language. Current technology also allows for limited translation of voice communications through speech recognition software installed on the computer. However, spoken language translation is mostly available in restricted domains, where the database of recognizable words is limited to a specific set of words.

SUMMARY OF THE INVENTION

A system and method to facilitate translation of communications between entities over a network are described. Multiple predetermined language constructs are communicated to a first entity as a first transmission over the network. Responsive to selection by the first entity of a language construct from the predetermined language constructs, a translated language construct corresponding to the selected language construct is identified. Finally, the translated language construct is communicated to a second entity as a second transmission over the network.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which:

FIG. 3A illustrates an exemplary stored constructs table.

FIG. 3B illustrates an exemplary stored translated constructs table.

DETAILED DESCRIPTION

A system and method to facilitate translation of communication between entities over a network are described. In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
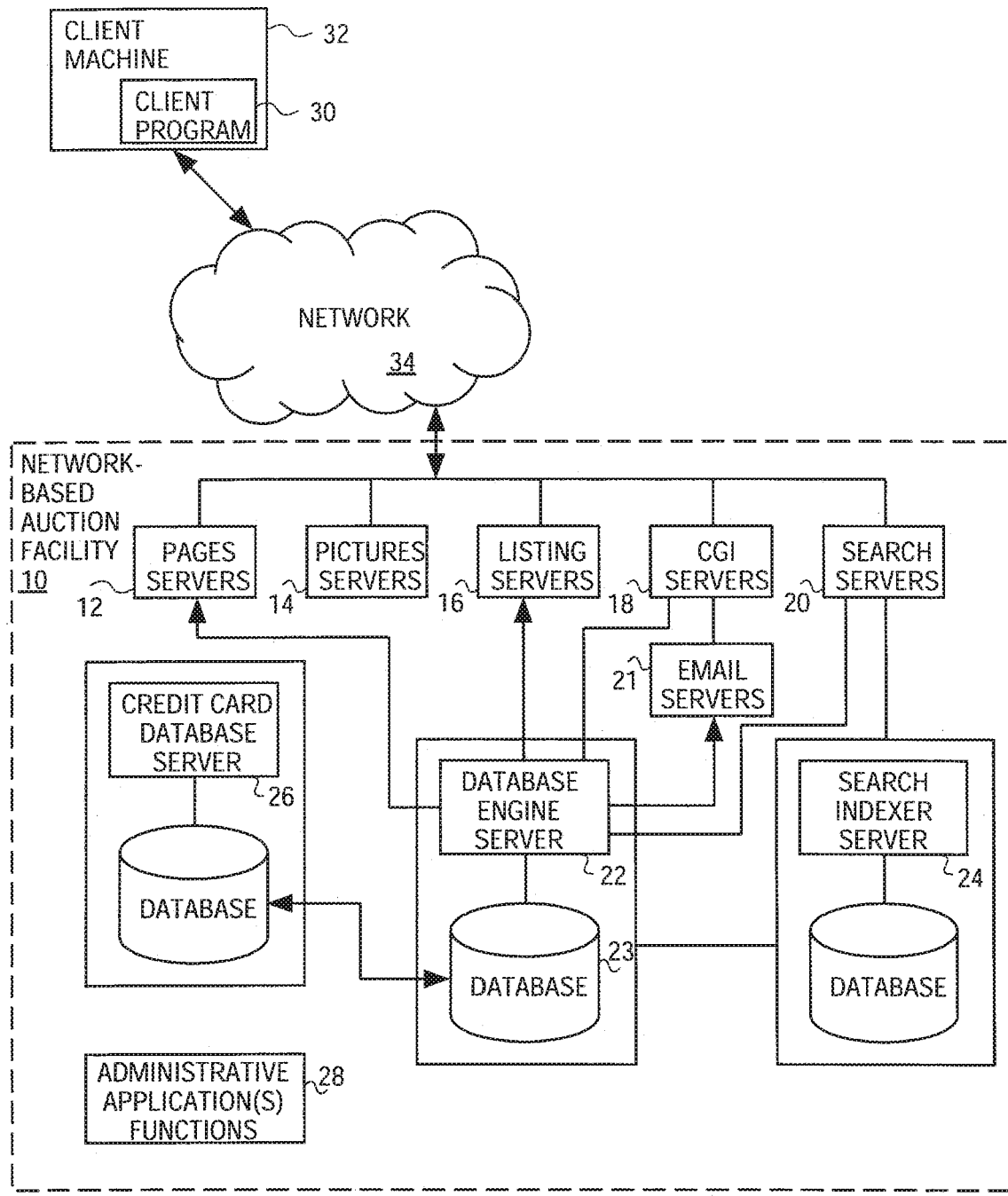
FIG. 1 is a block diagram illustrating an exemplary network-based transaction facility in the form of a network-based auction facility.

FIG. 1 is a block diagram illustrating an exemplary network-based transaction facility in the form of a network-based auction facility 10. While an exemplary embodiment of the present invention is described within the context of an auction facility, it will be appreciated b r those skilled in the art that the invention will find application in many different types of computer-based, and network-based, commerce facilities.

The auction facility 10 includes one or more of a number of types of front-end servers, namely communications servers in the exemplary form of page servers 12 that deliver web pages to multiple entities (e.g., markup language documents), picture servers 14 that dynamically deliver images to be displayed within the web pages, listing servers 16, processing servers in the exemplary form of Common Gateway Interface (CGI) or Internet Server Application Program Interface (ISAPI) servers 18 that provide an intelligent interface to the back-end of the auction facility 10, and search servers 20 that handle search requests to the auction facility 10. In addition, the auction facility 10 includes e-mail servers 21 that provide, inter alia, automated e-mail communications to/from entities of the facility 10.

The auction facility 10 further includes one or more back-end servers, for example a database engine server 22, a search indexer server 24 and a credit card database server 26, each of which maintains and facilitates access to a respective database 23. The network-based auction facility 10, such as an Internet-based auction facility 10, may be accessed by a client program 30, such as a browser (e.g., the Internet Explorer browser distributed by Microsoft Corporation of Redmond, Wash.) that executes on a client machine 32 and accesses the facility 10 via a network 34, such as, for example, the Internet. Other examples of networks that a client may utilize to access the auction facility 10 includes a wide area network (WAN), a local area network (LAN), a wireless network (e.g., a cellular network), or the Plain Old Telephone Service (POTS) network.

Figure 2:
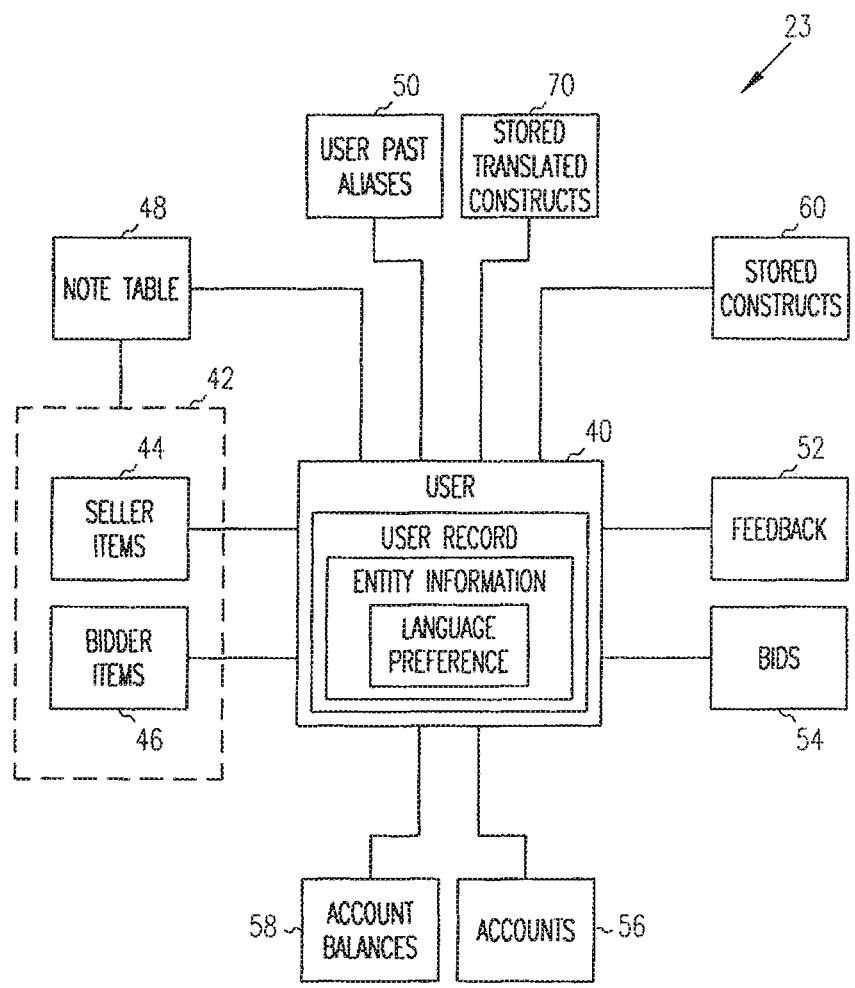
FIG. 2 is a block diagram illustrating an exemplary database, maintained by and accessed via a database engine server, which at least partially implements and supports the auction facility.

FIG. 2 is a block diagram illustrating an exemplary database 23, maintained by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as a collection of objects in an object-oriented database.

Central to the database 23 shown in FIG. 2 is a user table 40, which contains a record for each entity or user of the auction facility 10. Each user may operate as a seller, a buyer, or both, within the auction facility 10. The database 23 also includes items tables 42 that may be linked to the user table 40. Specifically, the table 42 includes a seller items table 44 and a bidder items table 46. A user record in the user table 40 may be linked to multiple items that are being, or have been, auctioned via the auction facility 10. A link indicates whether the user is a seller or a bidder (or buyer) with respect to items for which records exist within the items table 42.

The database 23 further includes a note table 48 populated with note records that may be linked to one or more item records within the items table 42 and/or to one or more user records within the user table 40. Each note record within the note table 48 may include, inter alia, a comment, description, history, or other information pertaining to an item being auctioned via the auction facility 10, or pertaining to a user of the auction facility 10.

A number of other tables are also shown to be linked to the user table 40, such as a user past aliases table 50, a feedback table 52, a bids table 54, an accounts table 56, and an account balances table 58.

The database 23 is also shown to include two tables specifically to enable an exemplary embodiment of the present invention. A stored construct table 60 stores a predetermined number of language constructs, such as sentences, phrases, questions, or any other known types of language constructs. A stored translated construct table 70 contains a number of records, each record storing translated language constructs corresponding to the language constructs stored in table 60. Prior to any communication between client 32 and the network-based auction facility 10, each translated language construct is generated and stored in the stored translated construct table 70, and the correspondence to one or more predetermined language constructs in the stored language constructs table 60 is defined, such that each translated language construct includes a predetermined translation of the corresponding predetermined language construct.

FIG. 3A illustrates an exemplary embodiment of a stored construct table 60. As illustrated in FIG. 3A, the table 60 includes a construct ID field 62 to store a unique identifier for each stored language construct to be used in an exemplary embodiment of the present invention. The table 60 further includes a construct field 64 to store each language construct maintained within the database 23.

FIG. 3B illustrates an exemplary embodiment of a stored translated construct table 70. As illustrated in FIG. 3B, the table 70 includes a construct ID field 72 to store a unique identifier for each translated language construct, which corresponds to the identifier of the language construct stored within field 62. The table 70 further includes a language ID field 74 to store an identifier for a language pertaining to the translated construct, and a translated construct field 76 to store the translated construct in the particular language identified in the language ID field 74.

Figure 4:
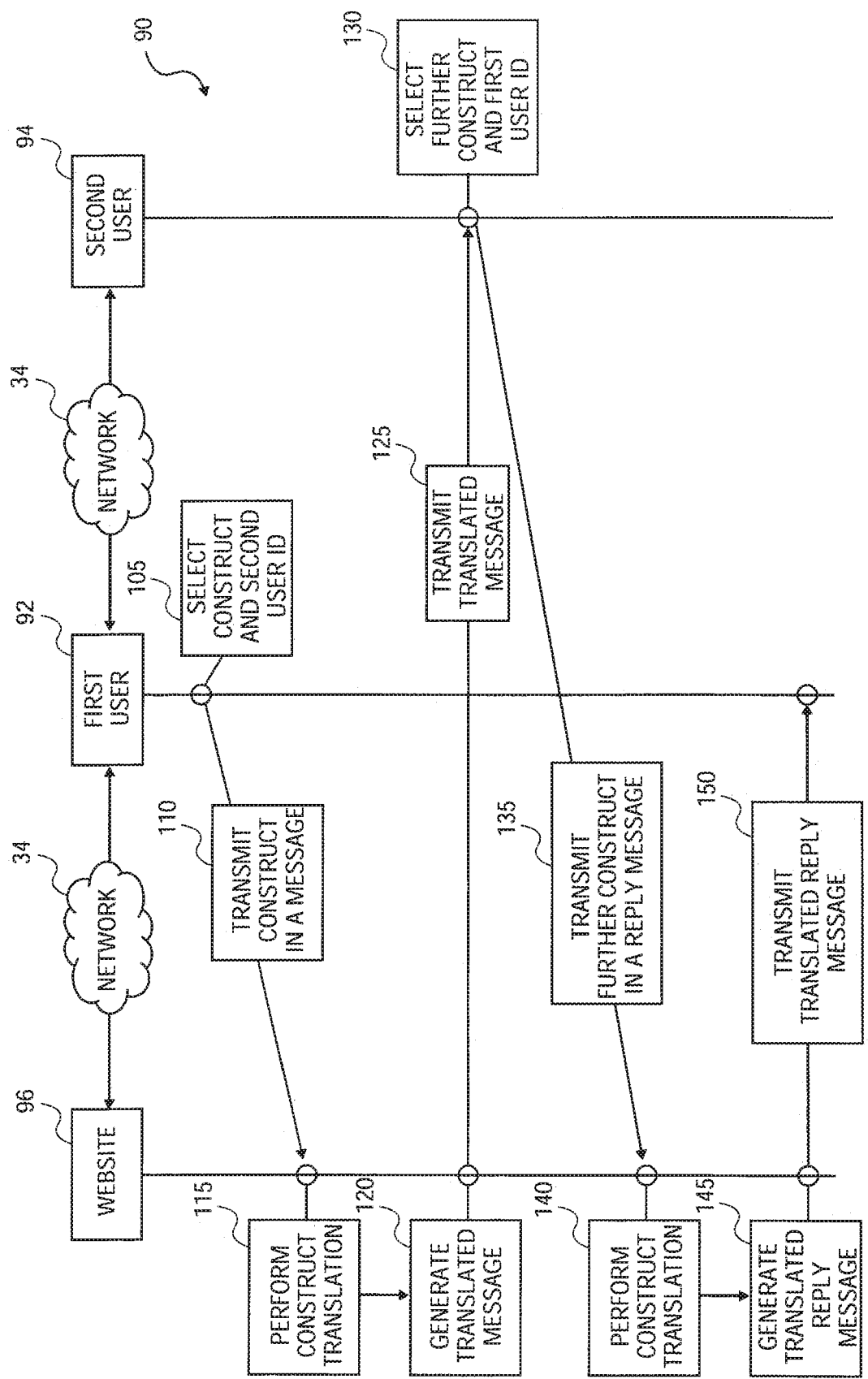
FIG. 4 is an interaction diagram illustrating a sequence of interactions, according to an exemplary embodiment of the present invention, to facilitate translation of communications between entities over a network.

FIG. 4 is an interaction diagram illustrating a sequence 90 of interactions, according to an exemplary embodiment of the present invention, to facilitate translation of communications between entities in the exemplary form of a first user 92 and a second user 94. While the sequence 90 describes a client-server environment, whereby communications between the first and second users 92 and 94 are facilitated by, or performed through, a website 96, it will also be appreciated that the teachings of the present inventions may be applied to a peer-to-peer environment, whereby the users 92 and 94 communicate directly and not through the website 96.

As illustrated in FIG. 4, the sequence 90 commences at block 105 with the selection by the first user 92 of a language construct and of a user identifier of the second user 94. The language construct may be selected, in one embodiment, from a drop-down list containing multiple predetermined language constructs, the drop-down list being displayed in a first interactive area of a web form communicated to the first user 92 from the website 96. Alternatively, the language construct may be selected from a window, which presents the web form containing the predetermined language constructs to the first user 92. The predetermined language constructs are generated and stored in the stored constructs table 60 of the database 23 prior to being communicated to the first user 92 in the drop-down list or web form.

At block 110, the language construct is communicated from the first user 92 to the website 96 via the network 34 in a message directed to the second user 94, for example an electronic mail (e-mail) message.

At block 115, the website 96 (e.g., the auction facility 10) utilizes the search servers 20 to conduct a search of the user table 40, the stored constructs table 60, and the stored translated constructs table 70 to retrieve a translated language construct, based on the user identifier corresponding to the second user 94. The search of the user table 40 locates the user information pertaining to the second user 94, including a language preference of the second user 94, and the search of the tables 60 and 70 locates the translated language construct corresponding to the selected language construct and the language preference of the second user 94. In one embodiment, the predetermined language constructs and the translated language constructs are generated and stored in respective tables 60 and 70 prior to the language constructs being communicated to the first user 92, so as to define a correspondence between each predetermined language construct and at least one associated translated language construct. Alternatively, the storing is so as to define a correspondence between a set of the translated language constructs, wherein each translated language construct of the set includes a predetermined translation of a common underlying language construct.

At block 120, the website 96 generates a translated message to be transmitted to the second user 94. In one embodiment, the translated message is an e-mail message generated by the e-mail servers 21 and directed to the second user 94, which contains the translated language construct. Alternatively, the translated e-mail message may contain multiple interactive fields to allow the second user 94 to respond to the first user 92.

At block 125, the translated message is communicated to the second user 94. In one embodiment, an e-mail message containing the translated language construct is communicated by the e-mail servers 21 to the second user 94.

At block 130, the second user 94 selects a further language construct and a user identifier of the first user 92 to which the further language construct is to be communicated. The further language construct may be selected, in one embodiment, from a drop-down list containing multiple predetermined language constructs translated in the language preference of the second user 94, the drop-down list being displayed in one interactive field of the multiple fields communicated to the second user 94 from the website 96. Alternatively, the second user 94 may only receive the translated message from the website 96 and take no further action.

At block 135, the further language construct is communicated from the second user 94 to the website 96 via the network 34 in a reply message directed to the first user 92, for example an electronic mail (e-mail) message.

At block 140, the website 96 (e.g., the auction facility 10) utilizes the search servers 20 to conduct a search of the user table 40, the stored constructs table 60, and the stored translated constructs table 70 to retrieve a translated further language construct, based on the user identifier corresponding to the first user 92. The search of the user table 40 locates the user information pertaining to the first user 92, including a language preference of the first user 92, and the search of the tables 60 and 70 locates the translated further language construct corresponding to the selected further language construct and the language preference of the first user 92.

At block 145, the website 96 generates a translated reply message to be transmitted to the first user 92. In one embodiment, the translated reply message is an e-mail message generated by the e-mail servers 21 and directed to the first user 92, which contains the translated further language construct.

At block 150, the translated reply message is communicated to the first user 92. In one embodiment, an e-mail message containing the translated further language construct is communicated by the e-mail servers 21 to the first user 92.

It should be noted that the sequence 90 may have any one of a number of applications and may be implemented within any number of environments. For example, the sequence 90 may be used to communicate information from any one entity, such as first or second users 92 and 94, to the website 96 in a language preferred by the respective entity. The website 96 may subsequently translate the information and use it in any one of a number of applications, such as in the preparation of item listings, or in the updating of the user information.

Figure 5:
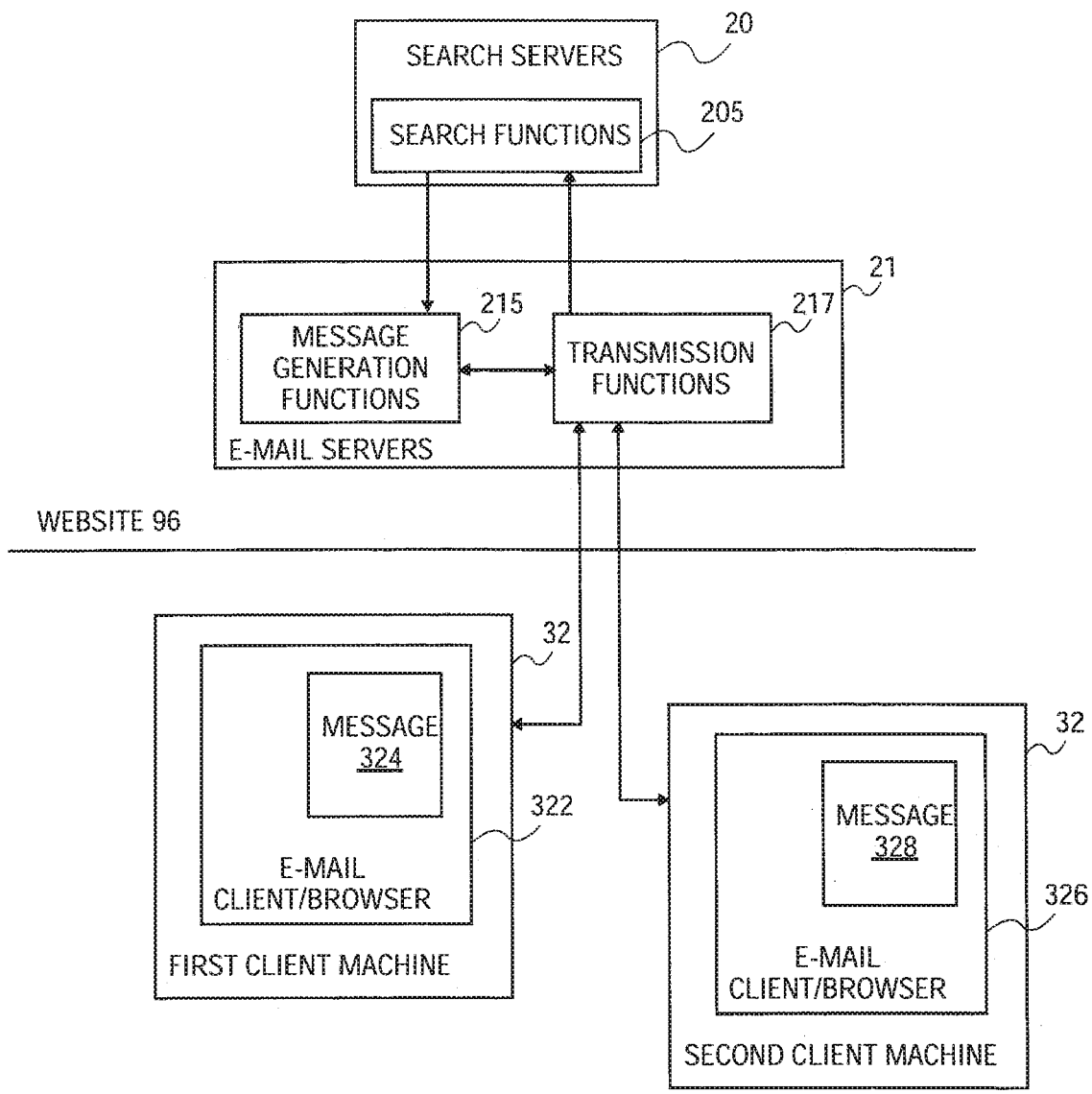
FIG. 5 is a block diagram illustrating an exemplary environment in which the interaction sequence illustrated in FIG. 4 may be employed.

FIG. 5 is a block diagram illustrating an exemplary environment in which the interaction sequence 90 may be employed. As illustrated in FIG. 5, client machines 32 are shown to reside outside the context of a website, such as the exemplary website 96 shown in FIG. 4. Accordingly, this embodiment describes an application which allows a first user of a client machine 32, such as the first client machine 32, to communicate language constructs to a second user of a further client machine 32, such as the second client machine 32, both of which reside outside the website 96 or any other commerce facility. Alternatively, each user of the client machines 32 may only communicate language constructs to the website 96 in order to request performance of applications by the website 96.

Referring to FIG. 5, the first user selects a language construct and a user identifier of the second user in an e-mail client or browser 322 that executes in the first client machine 32, the second user being the recipient of an e-mail message 324 containing the language construct to be communicated by the first user. The language construct may be selected, in one embodiment, from a drop-down list containing multiple predetermined language constructs, the drop-down list being displayed in a first interactive area of a web form communicated to the first user from the website 96. Alternatively, the language construct may be selected from a window, which presents the web form containing the predetermined language constructs to the first user.

The message is shown to be communicated to the e-mail servers 21 of the website 96. Specifically, the message containing the language construct may be communicated, in one embodiment, as an e-mail message or by utilizing any other transfer protocol or communication. The e-mail servers 21 receive the message using the transmission functions 217 and proceed to parse the message to extract the language construct and the user identifier for the second user that operates the second client machine 32.

The search servers 20 within the website 96 receive the language construct and the user identifier and search tables within corresponding databases using search functions 205 to provide a translated language construct to be communicated to the second user. Specifically, in one embodiment, the search servers 20 search the user table 40 shown in FIG. 2 to locate user information pertaining to the second user, including a language preference of the second user. The search servers 20 further search the stored constructs table 60 and the stored translated constructs table 70 shown in FIG. 2 to locate the translated language construct corresponding to the selected language construct and the language preference of the second user.

The translated language construct is subsequently communicated to the e-mail servers 21. The e-mail servers 21 generate a translated e-mail message containing the translated language construct using message generation functions 215. The translated e-mail message is then communicated to the second client machine via the transmission functions 217.

In one embodiment, the second user selects a further language construct and a user identifier of the first user in an e-mail client or browser 326 that executes in the second client machine 32, the first user being the recipient of a reply e-mail message 328 containing the further language construct to be communicated by the second user. The language construct may be selected, in one embodiment, from a drop-down list containing multiple predetermined language constructs translated in the language preference of the second user, the drop-down list being displayed in one interactive field of multiple interactive fields that may be communicated to the second user from the website 96. Alternatively, the second user may only receive the translated e-mail message and take no further action.

The reply message is shown to be communicated to the e-mail servers 21 of the website 96. Specifically, the reply message containing the further language construct may be communicated, in one embodiment, as an email message or by utilizing any other transfer protocol or communication. The e-mail servers 21 receive the reply message using the transmission functions 217 and proceed to parse the reply message to extract the further language construct and the user identifier for the first user that operates the first client machine 32.

The search servers 20 within the website 96 receive the further language construct and the user identifier and search tables within corresponding databases using search functions 205 to provide a translated further language construct to be communicated to the first user. Specifically, in one embodiment, the search servers 20 search the user table 40 shown in FIG. 2 to locate user information pertaining to the first user, including a language preference of the first user. The search servers 20 further search the stored constructs table 60 and the stored translated constructs table 70 shown in FIG. 2 to locate the translated further language construct corresponding to the selected further language construct and the language preference of the first user.

The translated further language construct is subsequently communicated to the e-mail servers 21. The e-mail servers 21 generate a translated reply message containing the translated further language construct using message generation functions 215. The translated reply message is then communicated to the first client machine via the transmission functions 217.

An alternative application would allow each user of the first or second client machines 32 to communicate selected language constructs to the website 96. In this case, the website 96 may perform search and translation operations and use the translated language construct to update listings via listing servers 16, or to update user information in the user table 40.

Figure 6:
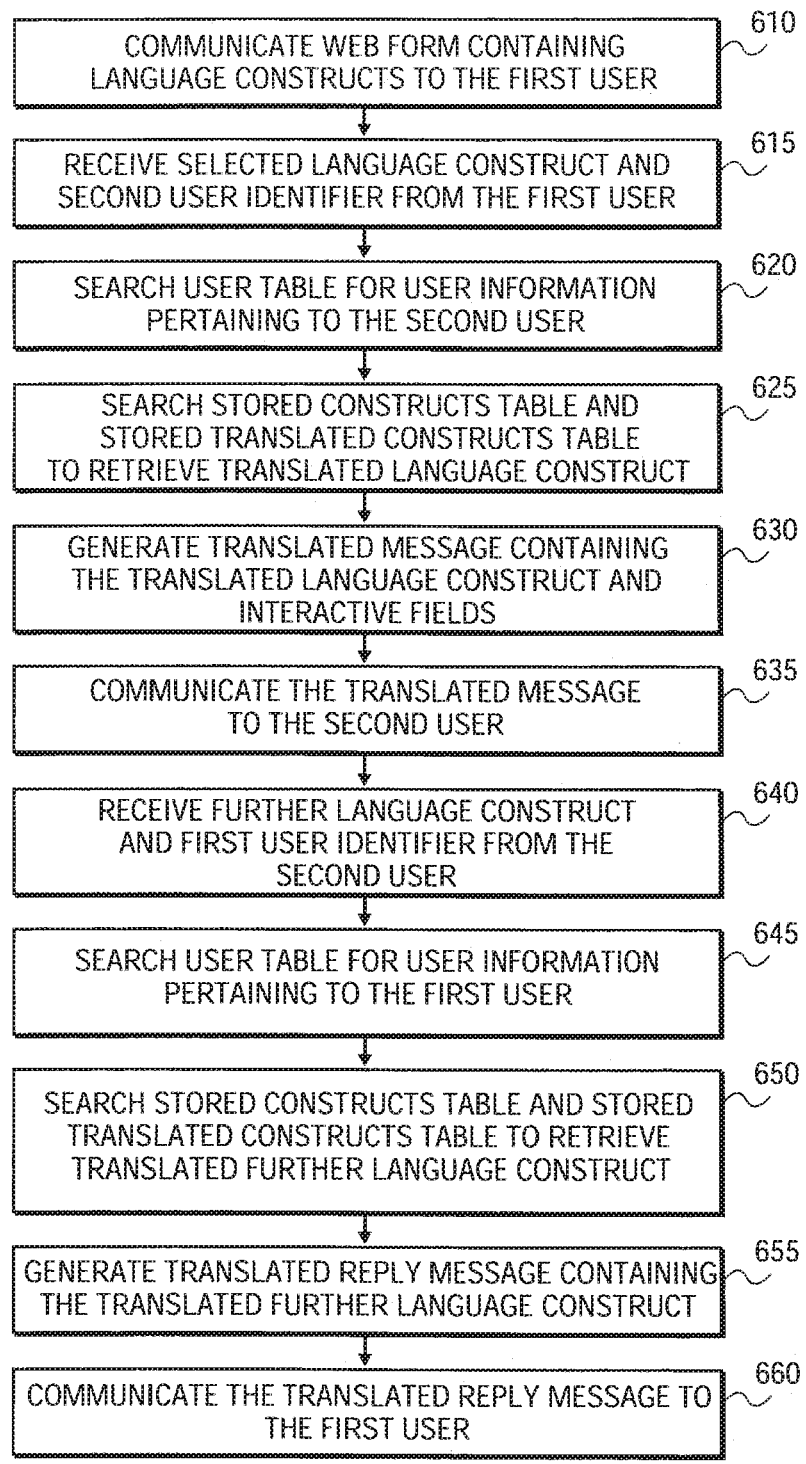
FIG. 6 is a flow chart illustrating a method, according to an exemplary embodiment of the present invention, to facilitate translation of communications between entities over a network.

FIG. 6 is a flow chart illustrating a method, according to an exemplary embodiment of the present invention, to facilitate translation of communications between entities over a network. It will be appreciated that the method may, as described above, be utilized to facilitate translation of communications, and is not limited to the context of a network-based auction facility.

As illustrated in FIG. 6, at processing block 610, a web form containing language constructs is communicated to the first user. At processing block 615, a selected language construct and a user identifier of the second user are received from the first user.

At processing block 620, the user table 40 is searched to locate user information pertaining to the second user, including a language preference of the second user. At processing block 625, the stored constructs table 60 and the stored translated constructs table 70 are searched to retrieve a translated language construct corresponding to the selected language construct.

At processing block 630, a translated message containing the translated language construct and multiple interactive fields is generated. At processing block 635, the translated message is communicated to the second user.

At processing block 640, a further language construct and a user identifier of the first user are received from the second user. At processing block 645, the user table 40 is searched to locate user information pertaining to the first user, including a language preference of the first user. At processing block 650, the stored constructs table 60 and the stored translated constructs table 70 are searched to retrieve a translated further language construct corresponding to the selected further language construct.

At processing block 655, a translated reply message containing the translated further language construct is generated. Finally, at processing block 660, the translated reply message is communicated to the first user.

Figure 7:
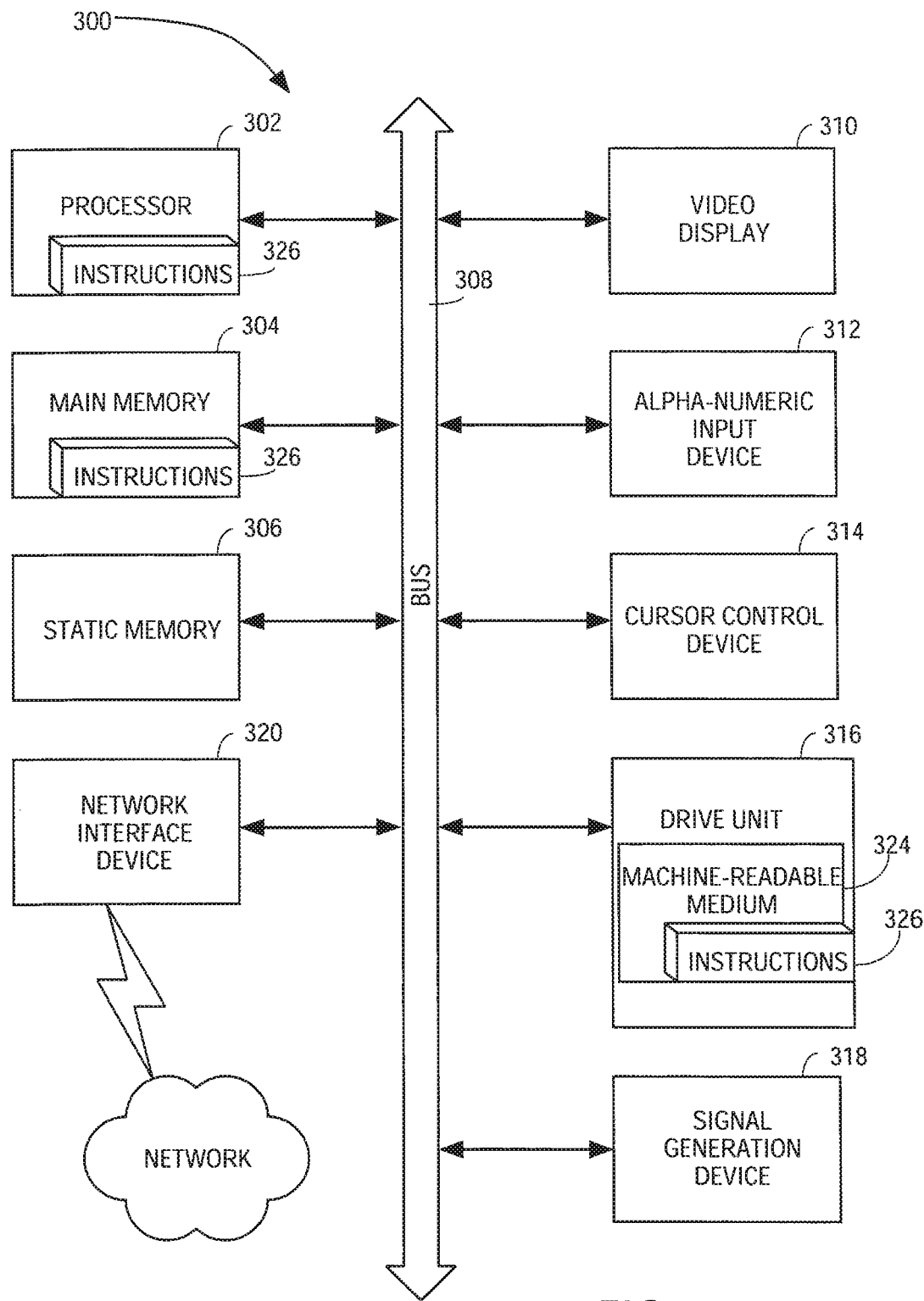
FIG. 7 is a diagrammatic representation of a machine in the exemplary form of a computer system within which a set of instructions may be executed.

FIG. 7 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alpha-numeric input device 312 (e.g., a keyboard), a cursor control device 314 (e.g., a mouse), a disk drive unit 316, a signal generation device 18 (e.g., a speaker), and a network interface device 320.

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   receiving, by a networked system, a first language construct transmitted from a device of a first entity that is directed to a second entity;
   identifying, by the networked system, a construct identifier corresponding to the first language construct;

determining, by the networked system, a language preference of the second entity, the language preference corresponding to a language identifier of a second language;

retrieving, by the networked system, a second language construct from a translated construct table by locating a row in the translated construct table that contains the construct identifier, the language identifier corresponding to the language preference of the second entity, and the second language construct, the second language construct being a translation of the first language construct into the second language corresponding to the language preference;

using the second language construct to update information associated with the first entity; and transmitting the updated information to a device of the second entity.

2. The method of claim 1, wherein the determining the language preference of the second entity comprises accessing stored user information of the second entity and identifying the language preference from the stored user information.

3. The method of claim 1, wherein:
the second entity is a website associated with the networked system; and
the using the second language construct to update information associated with the first entity comprises using the second language construct to generate or update a listing for the first entity.

4. The method of claim 1, wherein:
the second entity is a website associated with the networked system; and
the using the second language construct to update information associated with the first entity comprises using the second language construct to update user information for the first entity with the website.

5. The method of claim 1, wherein identifying the construct identifier corresponding to the first language construct comprises:
accessing a construct table, the construct table comprising a construct identifier field to store a unique identifier for each stored language construct and a construct field to store each language construct;
locating the first language construct in the construct table; and
retrieving, from the construct table, the construct identifier corresponding to the first language construct.

6. The method of claim 1, wherein the using the second language construct to update information associated with the first entity comprises using the second language construct to generate a translated communication that is transmitted to the device of the second entity.

7. The method of claim 1, wherein the translated construct table comprises a plurality of rows for a same first language construct, each of the plurality of rows for the same first language construct having a different language identifier and a different second language construct.

8. A hardware storage device storing instructions which, when executed by at least one hardware processor of a machine, cause the machine to perform operations comprising:
receiving a first language construct transmitted from a device of a first entity that is directed to a second entity;
identifying a construct identifier corresponding to the first language construct;
determining a language preference of the second entity, the language preference corresponding to a language identifier of a second language;
retrieving a second language construct from a translated construct table by locating a row in the translated construct table that contains the construct identifier, the language identifier corresponding to the language preference of the second entity, and the second language construct, the second language construct being a translation of the first language construct into the second language corresponding to the language preference;
using the second language construct to update information associated with the first entity; and
transmitting the updated information to a device of the second entity.

9. The hardware storage device of claim 8, wherein the determining the language preference of the second entity comprises accessing stored user information of the second entity and identifying the language preference from the stored user information.

10. The hardware storage device of claim 8, wherein:
the second entity is a website; and
the using the second language construct to update information associated with the first entity comprises using the second language construct to generate a listing for the first entity.

11. The hardware storage device of claim 8, wherein:
the second entity is a website; and
the using the second language construct to update information associated with the first entity comprises using the second language construct to update user information for the first entity with the website.

12. The hardware storage device of claim 8, wherein:
the second entity is a website; and
the using the second language construct to update information associated with the first entity comprises using the second language construct to update a listing for the first entity.

13. The hardware storage device of claim 8, wherein the using the second language construct to update information associated with the first entity comprises using the second language construct to generate a translated communication that is transmitted to the device of the second entity.

14. The hardware storage device of claim 8, wherein the operations further comprise:
searching a user table for the second entity; and
identifying a language identifier for the second entity from the user table, the language identifier corresponding to the language preference stored in the user table for the second entity.

15. A system comprising:
one or more hardware processors; and
a hardware storage device comprising instructions that when executed by the one or more hardware processors, cause the one or more hardware processors to perform operations comprising:
receiving a first language construct transmitted from a device of a first entity that is directed to a second entity;
identifying a construct identifier corresponding to the first language construct;
determining a language preference of the second entity, the language preference corresponding to a language identifier of a second language;
retrieving a second language construct from a translated construct table by locating a row in the translated construct table that contains the construct identifier, the language identifier corresponding to the language preference of the second entity, and the second language construct, the second language construct being a translation of the first language construct into the second language corresponding to the language preference;

using the second language construct to update information associated with the first entity; and transmitting the updated information to a device of the second entity.

16. The system of claim 15, wherein the determining the language preference of the second entity comprises accessing stored user information of the second entity and identifying the language preference from the stored user information.

17. The system of claim 15, wherein:

the second entity is a website; and the using the second language construct to update information associated with the first entity comprises using the second language construct to generate or update a listing for the first entity.

18. The system of claim 15, wherein:

the second entity is a website; and the using the second language construct to update information associated with the first entity comprises using the second language construct to update user information for the first entity with the web site.

19. The system of claim 15, wherein the using the second language construct to update information associated with the first entity comprises using the second language construct to generate a translated communication that is transmitted to the device of the second entity.

20. The method of claim 1, wherein the second entity is the networked system and the device of the second entity is a server of the networked system.

* * * * *